US012694865B2

(12) United States Patent
Li et al.

(10) Patent No.:  US 12,694,865 B2
(45) Date of Patent:       Jul. 28, 2026

(54) DIAGNOSTIC SERVICE IN SPEECH RECOGNITION

(71) Applicant: MICROSOFT TECHNOLOGY LICENSING, LLC, Redmond, WA (US)

(72) Inventors: Haoxuan Li, Beijing (CN); Rui Jiang, Beijing (CN); Yang Liu, Beijing (CN); Edward C Lin, Beijing (CN); Lei Sun, Beijing (CN); Che Zhao, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 142 days.

(21) Appl. No.: 18/707,542

(22) PCT Filed: Nov. 15, 2021

(86) PCT No.: PCT/CN2021/130536
§ 371 (c)(1),
(2) Date: May 3, 2024

(87) PCT Pub. No.: WO2023/082231
PCT Pub. Date: May 19, 2023

(65) Prior Publication Data
US 2025/0006178 A1      Jan. 2, 2025

(51) Int. Cl.
*G10L 15/01*         (2013.01)
*G10L 15/06*         (2013.01)
*G10L 15/19*         (2013.01)

(52) U.S. Cl.
CPC ............ *G10L 15/01* (2013.01); *G10L 15/063* (2013.01); *G10L 15/19* (2013.01)

(58) Field of Classification Search
None
See application file for complete search history.

(56) References Cited

U.S. PATENT DOCUMENTS 10,019,984  B2      7/2018   Kuo et al.
10,186,255  B2      1/2019   Tapuhi et al.
(Continued)

OTHER PUBLICATIONS

Extended European search report received in European Application No. 25153125.7, mailed on Apr. 8, 2025, 10 pages.
(Continued)

*Primary Examiner* — Douglas Godbold
(74) *Attorney, Agent, or Firm* — Workman Nydegger

(57) ABSTRACT

Systems and methods are provided for identifying targeted datasets that are configured to facilitate an improvement in the accuracy of an acoustic model included in the automatic speech recognition system. Systems obtain a obtain a test dataset comprising (i) audio data having natural speech utterances and (ii) a transcription of the natural speech utterances. Systems generate a text-to-speech dataset comprising audio data having synthesized speech utterances based on the transcription of the natural speech utterances. Systems apply the test dataset and the text-to-speech dataset to the acoustic model to obtain a first acoustic model output and a second acoustic model output, respectively. Systems identify a first set of errors in the first acoustic model output and a second set of errors in the second acoustic model output. Finally, based on comparing the first set of errors and the second set of errors, an acoustic model error ratio is generated.

15 Claims, 12 Drawing Sheets

(56) References Cited

U.S. PATENT DOCUMENTS

| | | | |
|---|---|---|---|
| 10,388,272 | B1 | 8/2019 | Thomson et al. |
| 10,558,738 | B1 | 2/2020 | Strimel et al. |
| 11,222,620 | B2 * | 1/2022 | Chen ...................... G10L 13/00 |
| 2021/0027766 | A1 | 1/2021 | Shi et al. |
| 2021/0097976 | A1 | 4/2021 | Chicote et al. |
| 2021/0280170 | A1 * | 9/2021 | Chen ................... G06N 3/0455 |
| 2021/0350786 | A1 * | 11/2021 | Chen ..................... G10L 15/063 |

OTHER PUBLICATIONS

"Amazon Transcribe", accessed on link https://web.archive.org/web/20210418015705/https:/aws.amazon.com/transcribe/, Apr. 18, 2021, 8 pages.

"Evaluate and Improve Custom Speech Accuracy", accessed on link https://learn.microsoft.com/en-us/azure/ai-services/speech-service/how-to-custom-speech-evaluate-data?pivots=speech-studio, Jan. 19, 2024, 6 pages.

"Improving Domain-Specific Transcription Accuracy with Custom Language Models", accessed on link https://web.archive.org/web/20201019222415/https:/docs.aws.amazon.com/transcribe/latest/dg/custom-language-models.html, Oct. 19, 2020, 3 pages.

"What is Custom Speech?", accessed on link https://learn.microsoft.com/en-us/azure/ai-services/speech-service/custom-speech-overview, Jan. 21, 2024, 3 pages.

Hilmi, et al., "CrossASR: Efficient Differential Testing of Automatic Speech Recognition via Text-To-Speech", IEEE International Conference on Software Maintenance and Evolution, 2020, pp. 640-650.

International Search Report and Written Opinion received for PCT Application No. PCT/CN21/130536, May 3, 2022, 24 pages.

Swenson, Loyd., "The Ethereal Aether: A History of the Michelson-Morley-Miller Aether-drift Experiments", University of Texas Press, 1972.

Communication pursuant to Rules 70(2) and 70a(2) Received in European Patent Application No. 25153125.7 mailed on May 12, 2025, 02 pages.

Communication pursuant to Article 94(3) EPC, Received in European Patent Application No. 21820451.9, mailed on Nov. 5, 2025, 06 pages.

First Office Action Received for Chinese Application No. 202180092220.X, mailed on Jan. 17, 2026, 13 pages. (English translation Provided).

Communication pursuant to Article 94(3) Received in European Patent Application No. 25153125.7, mailed on Feb. 16, 2026, 07 pages.

Communication pursuant to Article 94(3) EPC Received in European Patent Application No. 21820451.9, mailed on Jun. 17, 2026, 06 pages.

* cited by examiner

| Corpusname | Utterances | tokens | edits | WER |
|---|---|---|---|---|
| Real set | 2864 | 50948 | 6549 | 12.9% |
| Tts set | 2864 | 50948 | 3342 | 6.6% |

AM error ratio = (6549 - 3342)/6549 = 49%

| | Error ratio | Advice | details |
|---|---|---|---|
| AM | 50% | Similar scenario audio + trans | AM errors. |
| LM | 25% | Each word N number of sentences related | LM errors. |
| Lexicon | 10% | Listen and check the pronunciation | Lexicon errors. |
| Mixed | 15% | | |

802 → 804 → 806 → 808 →

810 812 814 816

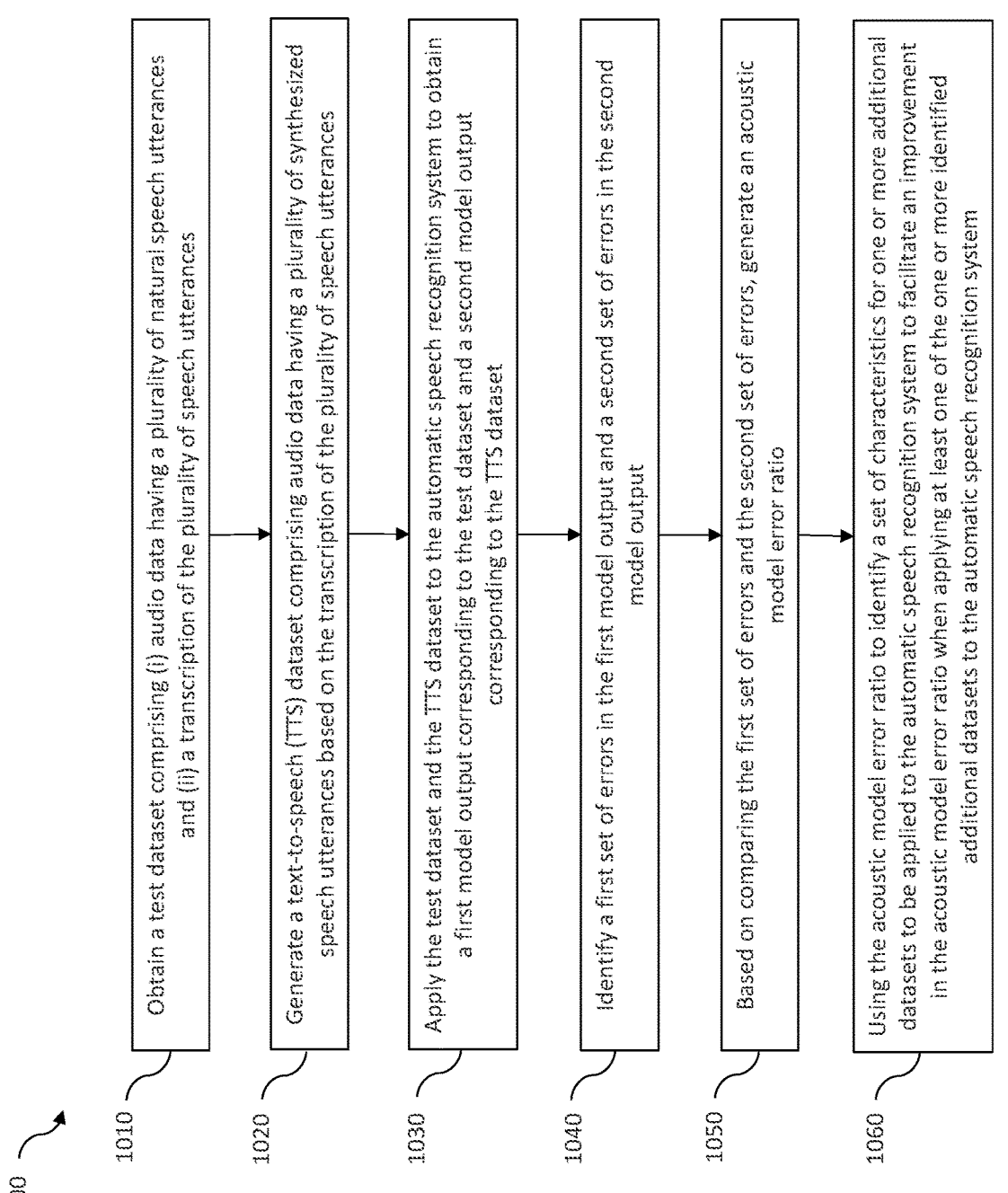

1000

1010 — Obtain a test dataset comprising (i) audio data having a plurality of natural speech utterances and (ii) a transcription of the plurality of speech utterances 1020 — Generate a text-to-speech (TTS) dataset comprising audio data having a plurality of synthesized speech utterances based on the transcription of the plurality of speech utterances 1030 — Apply the test dataset and the TTS dataset to the automatic speech recognition system to obtain a first model output corresponding to the test dataset and a second model output corresponding to the TTS dataset 1040 — Identify a first set of errors in the first model output and a second set of errors in the second model output 1050 — Based on comparing the first set of errors and the second set of errors, generate an acoustic model error ratio 1060 — Using the acoustic model error ratio to identify a set of characteristics for one or more additional datasets to be applied to the automatic speech recognition system to facilitate an improvement in the acoustic model error ratio when applying at least one of the one or more identified additional datasets to the automatic speech recognition system

*FIG. 10*

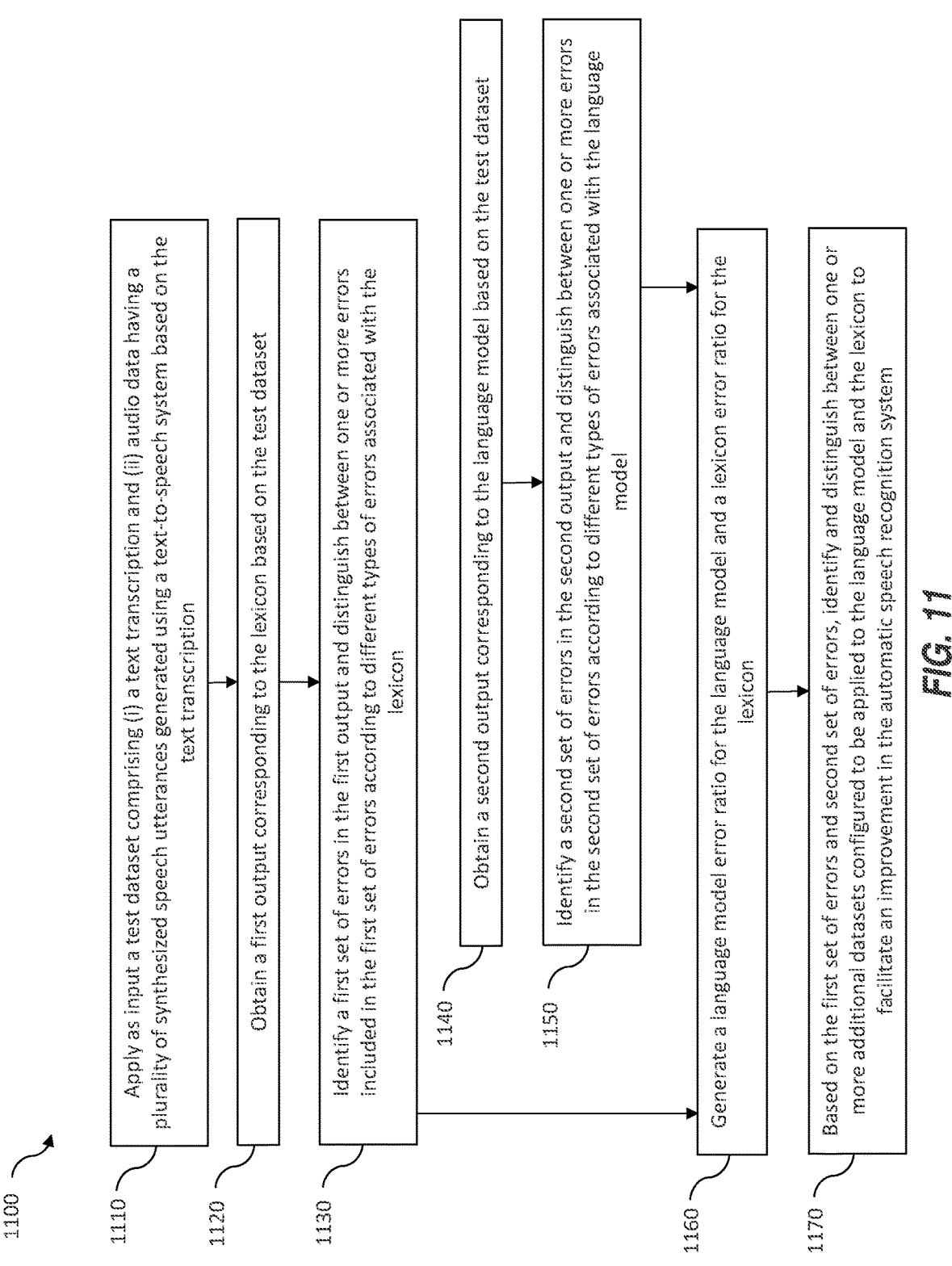

1100

1110 Apply as input a test dataset comprising (i) a text transcription and (ii) audio data having a plurality of synthesized speech utterances generated using a text-to-speech system based on the text transcription 1120 Obtain a first output corresponding to the lexicon based on the test dataset 1130 Identify a first set of errors in the first output and distinguish between one or more errors included in the first set of errors according to different types of errors associated with the lexicon 1140 Obtain a second output corresponding to the language model based on the test dataset 1150 Identify a second set of errors in the second output and distinguish between one or more errors in the second set of errors according to different types of errors associated with the language model 1160 Generate a language model error ratio for the language model and a lexicon error ratio for the lexicon 1170 Based on the first set of errors and second set of errors, identify and distinguish between one or more additional datasets configured to be applied to the language model and the lexicon to facilitate an improvement in the automatic speech recognition system

FIG. 11

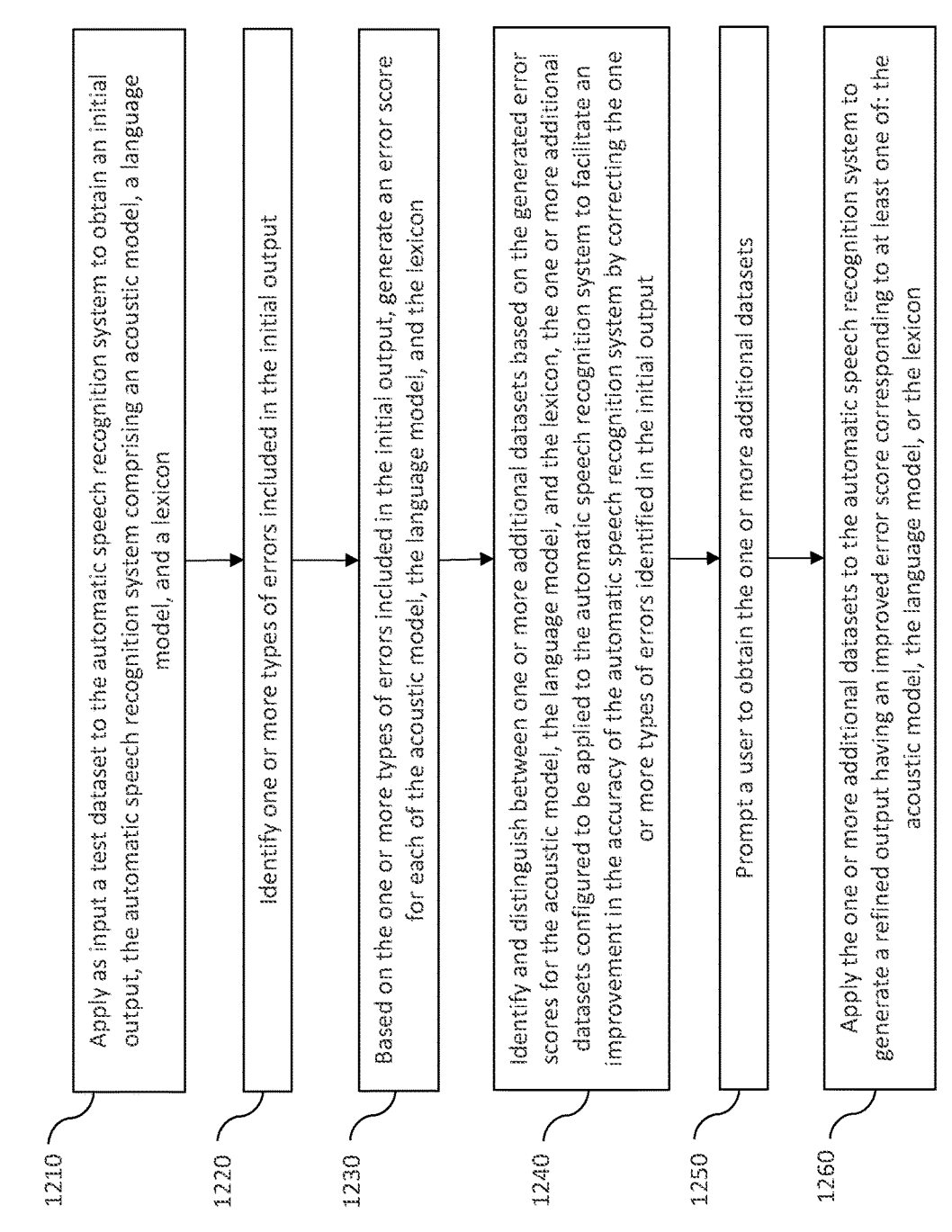

1200

1210 — Apply as input a test dataset to the automatic speech recognition system to obtain an initial output, the automatic speech recognition system comprising an acoustic model, a language model, and a lexicon 1220 — Identify one or more types of errors included in the initial output 1230 — Based on the one or more types of errors included in the initial output, generate an error score for each of the acoustic model, the language model, and the lexicon 1240 — Identify and distinguish between one or more additional datasets based on the generated error scores for the acoustic model, the language model, and the lexicon, the one or more additional datasets configured to be applied to the automatic speech recognition system to facilitate an improvement in the accuracy of the automatic speech recognition system by correcting the one or more types of errors identified in the initial output 1250 — Prompt a user to obtain the one or more additional datasets 1260 — Apply the one or more additional datasets to the automatic speech recognition system to generate a refined output having an improved error score corresponding to at least one of: the acoustic model, the language model, or the lexicon

FIG. 12

DIAGNOSTIC SERVICE IN SPEECH RECOGNITION

BACKGROUND

Speech recognition refers to the ability of an entity to recognize speech utterances found in audio data. Speech recognition performed by a computer is typically known as automatic speech recognition (ASR) or computer speech recognition. Automatic speech recognition systems typically employ one or more machine learning models that have been trained on a particular task as part of the speech recognition process. For example, some automatic speech recognition systems have an acoustic model trained to understand the relationship between the audio signal and the phonemes that make up speech.

Acoustic models are usually trained on a set of clean or noisy audio signals and a corresponding transcription which is transcribed by a human scribe. Some automatic speech recognition models also have a language model which is configured to determine a probability of a given sequence of words occurring in a sentence. The acoustic model and language model are used in tandem, such that as the acoustic model recognizes one or more phonemes in the audio signal, the phonemes are combined into predict word and phrase formation by the language model. In some instances, the automatic speech recognition models further use a lexicon or dictionary which is configured as a database of stored words and pronunciations.

One application of speech recognition models is speech-to-text generation, wherein audio comprising one or more recognizable speech utterances is recognized and then transcribed into a text transcription. Conversely, text-to-speech systems take text transcriptions as input and then generate audio data comprising spoken language based on words and phrases included in the text transcriptions.

Some automatic speech recognition systems are trained on a particular language (and/or a particular voice) or are trained as universal automatic speech recognition systems configured to recognize speech in many different languages and many different voices. However, some users want to customize their automatic speech recognition system for a new voice, new language, or new scenario application (e.g., a new domain). Current customization systems allow for users to choose one or more settings of the automatic speech recognition system to altern or enhance.

Professionally trained automatic speech recognition systems perform at a high rate of accuracy (i.e., have a low word error rate), in part because of the expertly crafted and curated data sets that are used to train the automatic speech recognition system. However, customized automatic speech recognition system may perform at a lower rate of accuracy (i.e., have a high or higher word error rate) when applied in practice. This is because user curated customized data sets may not be sufficient to fully refine the automatic speech recognition system on newly encountered customized situations, languages and/or voices to the level of the base training. When such errors occur, it may be difficult for users to identify the source of the errors as well as solutions that would mitigate or fix the errors.

Low speech recognition capabilities of existing automatic speech recognition systems, as described, can significantly degrade the quality of service provided by corresponding downstream applications and tasks, such as speech-to-text generation, text-to-speech generation, text query searching, audio query searching, etc.

In view of the foregoing, there is an ongoing need for improved systems and methods for training automatic speech recognition systems, particularly in facilitating user directed customization of automatic speech recognition systems.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments are directed towards systems and methods for performing diagnostics on automatic speech recognition models, for facilitating the identification of errors in speech recognition output, attributing errors to particular sources associated with automatic speech recognition systems, providing feedback associated with the errors, and suggesting solutions to improve the accuracy of the automatic speech recognition systems.

Some disclosed embodiments, for example, include systems and methods for identifying targeted datasets that are configured to facilitate an improvement in the accuracy of an acoustic model included in the automatic speech recognition systems. These systems are configured to obtain a test dataset comprising (i) audio data having a plurality of natural speech utterances and (ii) a transcription of the plurality of natural speech utterances. Systems are also configured to generate a text-to-speech dataset comprising audio data having a plurality of synthesized speech utterances based on the transcription of the plurality of natural speech utterances.

These systems are also configured to apply the test dataset and the text-to-speech dataset to the automatic speech recognition system to obtain a first model output corresponding to the test dataset and a second model output corresponding to the text-to-speech dataset. The disclosed systems are further configured to subsequently identify a first set of errors in the first model output and a second set of errors in the second model output and then, based on comparing the first set of errors and the second set of errors, to generate an acoustic model error ratio. This ratio can be used to identify and tune aspects of the disclosed models associated with the error ratio.

Some disclosed embodiments are also directed to systems and methods for identifying targeted datasets configured to facilitate an improvement in the accuracy of a language model and a lexicon included in the automatic speech recognition system. In such embodiments, systems are configured to apply as input a test dataset comprising (i) a text transcription and (ii) audio data having a plurality of synthesized speech utterances generated using a text-to-speech system based on the text transcription.

Additionally, disclosed systems are also configured to obtain a first output corresponding to the lexicon based on the test dataset and identify a first set of errors in the first output and distinguish between one or more errors included in the first set of errors according to different types of errors associated with the lexicon.

Systems are also configured to obtain a second output corresponding to the language model based on the test dataset and identify a second set of errors in the second output and distinguish between one or more errors in the second set of errors according to different types of errors associated with the language model.

In some instances, the systems are configured to subsequently generate a language model error ratio for the language model and a lexicon error ratio for the lexicon. Then, based on the first set of errors and second set of errors, systems are configured to identify and distinguish between one or more additional datasets configured to be applied to the language model and the lexicon to facilitate an improvement in the corresponding automatic speech recognition systems.

Embodiments are also directed to systems and methods for facilitating an improvement in the accuracy of an automatic speech recognition model. For example, some disclosed systems are configured to apply as input a test dataset to the automatic speech recognition system to obtain an initial output, the automatic speech recognition system comprising an acoustic model, a language model, and a lexicon, the test dataset comprising (i) a text transcription, (ii) audio data having a plurality of natural speech utterances and a plurality of synthesized natural speech utterances. These systems are also configured to identify one or more types of errors included in the initial output. Then, based on the one or more types of errors included in the initial output, the systems are configured to generate an error score for each of the acoustic model, the language model, and the lexicon.

Additionally, some systems are configured to identify and distinguish between one or more additional datasets based on the generated error scores for the acoustic model, the language model, and the lexicon, wherein the one or more additional datasets are configured to be applied to the automatic speech recognition system to facilitate an improvement in the accuracy of the automatic speech recognition system by correcting the one or more types of errors identified in the initial output.

In some instances, after identifying one or more additional datasets, systems are configured to prompt a user to obtain the one or more additional datasets and then apply the one or more additional datasets to the automatic speech recognition system to generate a refined output having an improved error score corresponding to at least one of: the acoustic model, the language model, or the lexicon.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 10 illustrates a process flow diagram comprising a plurality of acts associated with a method for identifying targeted datasets configured to facilitate an improvement in the accuracy of an acoustic model included in an automatic speech recognition system.

FIG. 11 illustrates a process flow diagram comprising a plurality of acts associated with a method for identifying targeted datasets configured to facilitate an improvement in the accuracy of a language model and a lexicon included in an automatic speech recognition system.

FIG. 12 illustrates a process flow diagram comprising a plurality of acts associated with a method for identifying targeted datasets configured to facilitate an improvement in the accuracy of an automatic speech recognition system.

DETAILED DESCRIPTION

Figure 1:
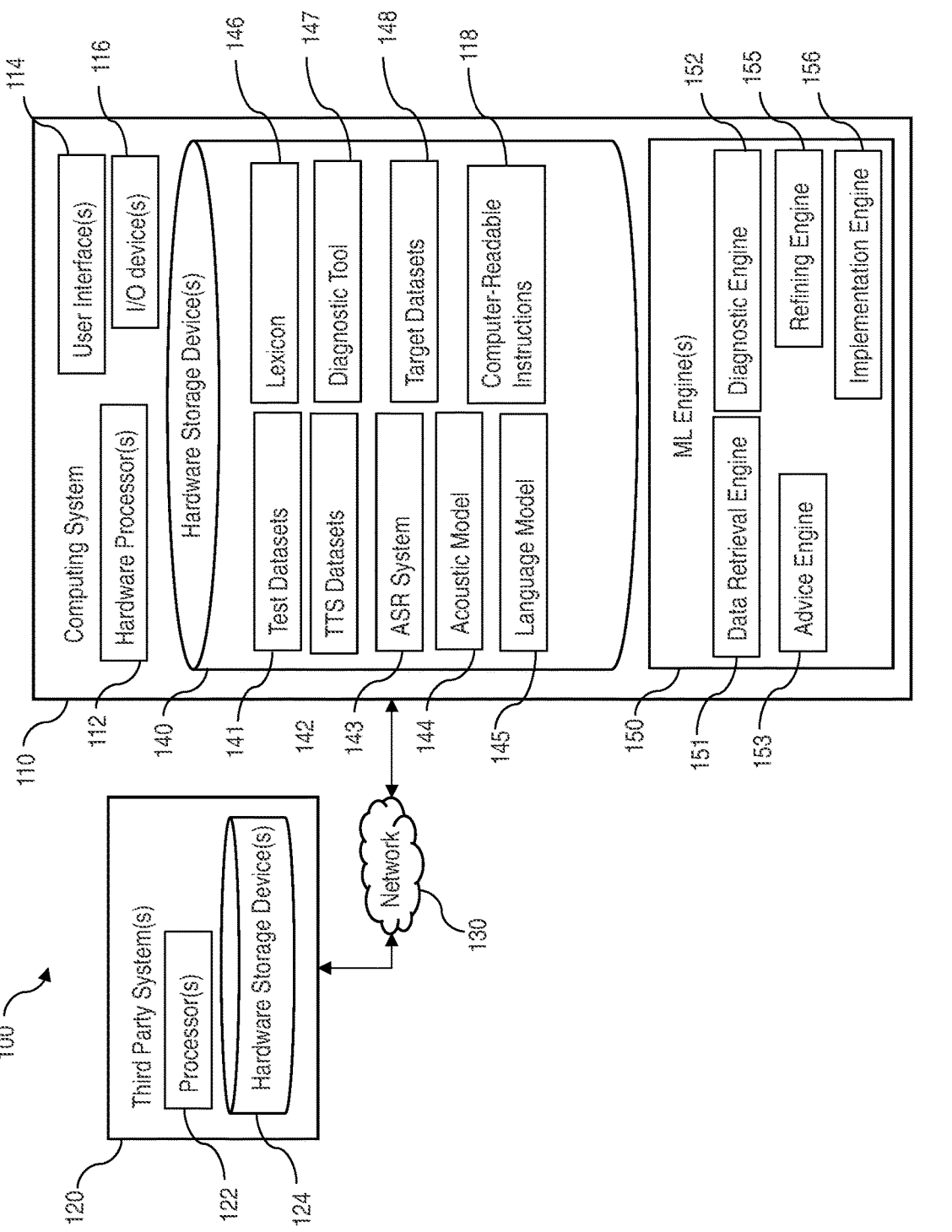
FIG. 1 illustrates a computing environment in which a computing system incorporates and/or is utilized to perform disclosed aspects of the disclosed embodiments.

Disclosed embodiments are directed towards systems and methods for performing diagnostics on an automatic speech recognition model to identify errors in the speech recognition output, attribute the errors to a particular source associated with the automatic speech recognition system, provide feedback to a user, and suggest solutions to improve the accuracy of the automatic speech recognition system.

The disclosed embodiments include or may be implemented to provide various technical benefits. For example, customization of speech recognition systems is beneficial and desirable to enable users to tailor their own neural-network speech recognition models on top of unified baseline models. This allows users to overcome speech recognition barriers such as background noise, accents, or unique vocabularies within automatic speech recognition systems they are using. With the current embodiments, users are enabled to upload in-domain training data to train a customized model, and upload testing data (e.g., audio data and corresponding human-labeled transcription) to evaluate the accuracy (e.g., error rate numbers) of a model. The improved customization process does not require significant amounts of professional artificial intelligence (AI) knowledge, including diagnostic ability. This is because the error rate numbers generated by the diagnostic system are accompanied with additional information that provide users a way to determine the specific issues. The additional information also provides executable next steps that users can follow to fine-tune the model in iterations.

In some implementations, disclosed systems and methods are configured to alert a user to insertion, deletion, and substitution errors, as well as classify the errors in the test set according to the type of model that is the source of the error. For example, the systems are able to identify errors in the automatic speech recognition output and attribute the errors to the lexicon, the acoustic model, and/or the language model. In this manner, users are able to determine the main types of data that should be collected and applied to the automatic speech recognition system in order to improve the error rates and overall performance.

Additionally, some disclosed embodiments include systems configured to identify natural and synthesized words that have low scores in the acoustic model and/or that are not included in the lexicon (i.e., dictionary), and to improve the accuracy of the model based on prompting by and interactions with the system. For instance, in some embodiments, a text-to-speech system is used to generate pronunciations of the low score words, allowing a user to check whether the pronunciation is correct. The systems are also configured to output the words in the transcription that are not in the vocabulary of the lexicon language model and identify words and phrases that lack context. Based on these diagnostics, the systems are able to provide suggestions to the user to add different types of data and suggest the content of the data that will best improve the accuracy of the automatic speech recognition system.

Attention will now be directed to FIG. 1, which illustrates components of a computing system 110 which may include and/or be used to implement aspects of the disclosed invention. As shown, the computing system includes a plurality of machine learning (ML) engines, models, neural networks and data types associated with inputs and outputs of the machine learning engines and models.

FIG. 1 illustrates the computing system 110 as part of a computing environment 100 that also includes third-party system(s) 120 in communication (via a network 130) with the computing system 110. The computing system 110 is configured to identify, collect from a user, and apply targeted datasets configured to facilitate an improvement in the accuracy of the acoustic model, the lexicon, and/or the language model in order to improve an overall accuracy of the automatic speech recognition system.

The computing system 110, for example, includes one or more processor(s) (such as one or more hardware processor(s)) 112 and a storage (i.e., hardware storage device(s) 140) storing computer-readable instructions 118 wherein one or more of the hardware storage device(s) 140 is able to house any number of data types and any number of computer-readable instructions 118 by which the computing system 110 is configured to implement one or more aspects of the disclosed embodiments when the computer-readable instructions 118 are executed by the one or more processor(s) 112. The computing system 110 is also shown including user interface(s) 114 and input/output (I/O) device(s) 116.

As shown in FIG. 1, hardware storage device(s) 140 is shown as a single storage unit. However, it will be appreciated that the hardware storage device(s) 140 is, a distributed storage that is distributed to several separate and sometimes remote systems and/or third-party system(s) 120. The computing system 110 can also comprise a distributed system with one or more of the components of computing system 110 being maintained/run by different discrete systems that are remote from each other and that each perform different tasks. In some instances, a plurality of distributed systems performs similar and/or shared tasks for implementing the disclosed functionality, such as in a distributed cloud environment.

The hardware storage device(s) 140 are configured to store the different data types including test datasets 141, TTS datasets 142, and target datasets 148, described herein.

The storage (e.g., hardware storage device(s) 140) includes computer-readable instructions 118 for instantiating or executing one or more of the models and/or engines shown in computing system 110 (e.g., ASR system 143, acoustic model 144, language model 145, and/or lexicon 146). The models are configured as machine learning models or machine learned models, such as deep learning models and/or algorithms and/or neural networks. In some instances, the one or more models are configured as engines or processing systems (e.g., computing systems integrated within computing system 110), wherein each engine (i.e., model) comprises one or more processors (e.g., hardware processor(s) 112) and computer-readable instructions 118 corresponding to the computing system 110.

ASR System

The automatic speech recognition system (e.g., ASR system 143) is configured to recognize spoken language utterances in natural or simulated audio. The ASR system 143 comprises an acoustic model 144, a language model 145, and a lexicon 146. The ASR system 143 is first trained recognize speech in one or more different languages and from one or more different voices. In some instances, the ASR system 143 recognizes speech utterances in multiple languages and multiple voices simultaneously. Subsequently, the ASR system 143 is customizable according to different domains such as scenarios, new speakers, new languages, or new vocabulary associated with a particular field or enterprise domain. For example, when customization training datasets are applied to the acoustic model 144, the acoustic model 144 is customized to the acoustic characteristics of the new domain. Additionally, the lexicon 146 learns new vocabulary words and their pronunciations, and the language model 145 learns grammar, syntax, and context from utterances associated with the new domain.

However, after customization, the ASR system 143 may not perform at as high of accuracy rates when recognizing speech in the new domain as compared to accuracy rates associated with the customized (or un-customized) ASR system applied to a domain it was previously trained on. With additional training datasets, identified by the disclosed embodiments, which are associated with the new domain applied to the ASR system 143, a user is able to further refine the customized model and improve one or more of the error ratios.

Test Datasets

The one or more test datasets 141 comprise natural audio data with corresponding ground truth transcriptions. The natural audio data comprises spoken language utterances without a corresponding clean speech reference signal, meaning the audio data may contain different noise and unrecognizable speech. Natural audio data is recorded from a plurality of sources, including applications, meetings comprising one or more speakers, ambient environments including background noise and human speakers, etc. Ground truth transcription labels comprise phoneme labeling for audio data, in particular the natural audio data and/or simulated audio data. The ground truth transcription labels are text transcriptions that correspond to spoken language utterances included in the natural audio data or other audio data. The ground truth transcription labels are obtained via human transcription or machine transcription (e.g., speech-to-text machine learning models).

TTS Datasets

The one or more TTS datasets 142 comprise simulated audio data comprises clean reference audio data (e.g., text-to-speech data generated from a ground truth transcription label) and/or a mixture of simulated clean speech (e.g., clean reference audio data) and one or more of: room impulse responses, isotropic noise, or transient noise. Thus, parallel clean audio data and noisy audio data is generated using the clean reference audio data on the one hand, and a mixture of the clean reference audio data and background noise data on the other hand. Simulated noisy speech data can also be generated by distorting the clean reference audio data. However, typically the TTS datasets comprise only the clean speech when being compared against the test datasets since the ASR systems (e.g., ASR system 143) are able to more accurately and easily identify spoken utterances in clean speech than noisy speech. In this manner, the diagnostic tool is better able to determine the error ratio of the ASR system 143 on natural audio data.

Target Datasets

After determining the error ratios of the different models (e.g., acoustic model 144, language model 145, and/or lexicon 146) of the ASR system 143, the computing system 110 is configured to generate and present advice to a user that includes suggestions for additional training data for the user to collect and apply to the automatic speech recognition. The one or more target datasets 148 comprise the additional training data that a user has or will collect based on the suggestions generated by the diagnostic tool 147. The system is able to identify and distinguish between one or more possible datasets that could be applied to one or more of the models to facilitate an improvement in one or more of the model error ratios. The system is also able to select an optimal dataset (e.g., a dataset that will yield the highest improvement in the accuracy of the automatic speech recognition system) from the one or more possible datasets and present that optimal dataset as a target data for the user to collect and send to the system.

The system is also able to identify one or more characteristics associated with the test dataset, wherein the targeted dataset is selected from the one or more additional datasets based on the targeted dataset corresponding to the one or more characteristics. Furthermore, the characteristics are identified from the test dataset or based on pre-defined user specifications such that the characteristics of the target dataset are the same as or similar as those found in the test dataset or user specifications. For example, the one or more characteristics are identifiable based on a particular speaking scenario, a particular set of background noises, or a particular enterprise domain.

When the system identifies one or more low recall words in the output of the automatic speech recognition system, the system is configured to suggest additional datasets to the user that include words and phrases that correspond to the one or more low recall words, such that ASR system 143 is better able to recognize the previously low recall scoring words.

ML Engines

An additional storage unit for storing machine learning (ML) Engine(s) 150 is presently shown in FIG. 1 as storing a plurality of machine learning models and/or engines. For example, computing system 110 comprises one or more of the following: a data retrieval engine 151, a diagnostic engine 152, an advice engine 153, a refining engine 155, and an implementation engine 156, which are individually and/or collectively configured to implement the different functionality described herein.

Data Retrieval Engine

For example, the data retrieval engine 151 is configured to locate and access data sources, databases, and/or storage devices comprising one or more data types from which the data retrieval engine 151 can extract sets or subsets of data to be used as training data (e.g., test data and/or TTS data). The data retrieval engine 151 receives data from the databases and/or hardware storage devices, wherein the data retrieval engine 151 is configured to reformat or otherwise augment the received data to be used as training data. Additionally, or alternatively, the data retrieval engine 151 is in communication with one or more remote systems (e.g., third-party system(s) 120) comprising third-party datasets and/or data sources. In some instances, these data sources comprise visual services that record or stream text, images, and/or video.

The data retrieval engine 151 accesses electronic content comprising simulated audio data, natural audio data, ground truth transcription labels, clean reference audio data, and/or other types of audio-visual data including video data, image data, holographic data, 3-D image data, etc. The data retrieval engine 151 is a smart engine that is able to learn optimal dataset extraction processes to provide a sufficient amount of data in a timely manner as well as retrieve data that is most applicable to the desired applications for which the machine learning models/engines will be trained. For example, the data retrieval engine 151 can learn which databases and/or datasets will generate training data that will train a model (e.g., for a specific query or specific task) to increase accuracy, efficiency, and efficacy of that model in the desired audio data processing techniques.

The data retrieval engine 151 locates, selects, and/or stores raw recorded source data wherein the data retrieval engine 151 is in communication with one or more other ML engine(s) and/or models included in computing system 110. In such instances, the other engines in communication with the data retrieval engine 151 are able to receive data that has been retrieved (i.e., extracted, pulled, etc.) from one or more data sources such that the received data is further augmented and/or applied to downstream processes. For example, the data retrieval engine 151 is in communication with the refining engine 155 and/or implementation engine 156.

The data retrieval engine 151 is configured to retrieve test datasets and one or more additional datasets comprising simulated audio data (i.e., a mixture of clean speech and room impulse responses, isotropic noise, or transient noise), non-simulated audio data including spoken language utterances without corresponding clean speech reference signals, speech data for a target domain corresponding to a target enterprise domain, a target speaking context, or a particular target user. The data retrieval engine 151 is configured to retrieve data that has been collected by a user in response to receiving prompts to obtain one or more additional datasets (e.g., target datasets). The prompts are generated by the advice engine 153.

Diagnostic/Advice Engines

The diagnostic engine 152 is configured to perform diagnostics on the ASR system 143, while the advice engine 153 is configured to generate recommendations to a user for improving the error ratios associated with the ASR system 143. For example, the diagnostic engine 152 is configured to apply a test dataset to the ASR system 143 in order to determine an error ratio for each of the different models (e.g., acoustic model 144, lexicon 146, language model 145). The diagnostic engine 152 also identifies errors in the output from the ASR system 143 and categorizes the errors according to different error types.

The diagnostic engine 152 distinguishes between different errors attributed to the acoustic model at least based on the generated text-to-speech dataset (e.g., TTS datasets 142) and its corresponding output versus the natural speech dataset (e.g., test datasets 141). Then, based on the different errors and corresponding acoustic model error ratio, the advice engine 153 identifies and distinguishes between one or more additional datasets configured to be applied to the acoustic model to facilitate an improvement in the acoustic model error ratio. The advice engine 153 also presents to a user one or more targeted datasets selected from the one or more additional datasets to be applied to the acoustic model.

The diagnostic engine 152 identifies different types of errors that are attributable to the language model. For example, some errors are identified as out-of-grammar errors, a low-score word error, or a compound word error. An out-of-grammar error occurs when any word in an utterance does not in the unigram list in the language model. A low-score word error occurs when the language model is unable to understand enough context around a particular word to give meaning to the whole utterance. A compound word error occurs when the output from the language model incorrectly combines two or more words into a single word, or when a single word is incorrectly broken up into two or more words.

Based on the different types of errors attributed to the language model 145, the advice engine 153 identifies and distinguishes between one or more additional datasets (e.g., target datasets 148) that are configured to further refine the language model 145, such that an error ratio score associated with the language model 145 is improved. This facilitates an overall improvement in the customized ASR system and any other downstream applications that use the output of the customized ASR system.

The diagnostic engine 152 also identifies different types of errors that are attributable to the lexicon. For example, some errors are identified as out-of-vocabulary word errors or a low similarity word error. Out-of-vocabulary word errors occur when a word included in the ASR output is not included in the lexicon 146 or dictionary of words. A low similarity word error occurs when the pronunciation of a word is not determined to be similar to a pronunciation stored for one or more different words in the lexicon-146.

Based on the different types of errors attributed to the lexicon 146, the advice engine 153 identifies and distinguishes between one or more additional datasets (e.g., target datasets 148) that are configured to further refine the lexicon 146, such that an error ratio score associated with the lexicon 146 is improved. This facilitates an overall improvement in the customized ASR system and any other downstream applications that use the output of the customized ASR system.

Then, the diagnostic engine 152 attributes the errors to a particular model, wherein the diagnostic engine 152 determines an error ratio for the particular model. The diagnostic engine 152 also compares the error ratios of a newly customized model against the error ratios of the baseline model in order to determine where the customization training was insufficient. Additionally, after applying one or more target datasets to the ASR system 143, the diagnostic engine 152 is configured to determine whether the acoustic model 144, the language model 145, or the lexicon 146 has experienced an improvement in the respective error ratio based on analyzing a refined output. The refined output will have less errors than the initial output of the previously customized automatic speech recognition system.

Refining Engine

After the diagnostic engine 152 has determined all the error ratios and the advice engine 153 has presented suggestions for additional datasets to the user, the user is then able to collect one or more of the additional datasets, for example, by using the data retrieval engine 151. Once the system is able to obtain the one or more additional datasets, the refining engine 155 applies the additional datasets to the ASR system 143 in order to further refine the previously trained and customized ASR system (e.g., ASR system 143).

The refining engine 155 is in communication with one or more of the data retrieval engine 151, the diagnostic engine 152, or advice engine 153. In such embodiments, the refining engine 155 is configured to receive one or more sets of additional training data (e.g., target datasets 148) from the data retrieval engine 151. After receiving training data relevant to a particular application, task, or domain, the refining engine 155 further refines one or more models on the training data to improve one or more accuracy scores associated with the previously customized ASR system. The refining engine 155 is configured to train a model via unsupervised training and/or supervised training. The refining engine 155 is configured to train one or more machine learning models various datasets, including simulated audio data and natural audio data.

Implementation Engine

The computing system 110 includes an implementation engine 156 in communication with any one of the models and/or ML engine(s) 150 (or all of the models/engines) included in the computing system 110 such that the implementation engine 156 is configured to implement, initiate, or run one or more functions of the plurality of ML engine(s) 150. In one example, the implementation engine 156 is configured to operate the data retrieval engines 151 so that the data retrieval engine 151 retrieves data at the appropriate time to be able to generate training data for the refining engine 155. The implementation engine 156 facilitates the process communication and timing of communication between one or more of the ML engine(s) 150 and is configured to implement and operate a machine learning model (or one or more of the ML engine(s) 150) which is configured as an ASR system 143.

The computing system is in communication with third-party system(s) 120 comprising one or more processor(s) 122, one or more of the computer-readable instructions 118, and one or more hardware storage device(s) 124. It is anticipated that, in some instances, the third-party system(s) 120 further comprise databases storing data that may include training data, for example, in the format of audio data that is not included in local storage. Additionally, or alternatively, the third-party system(s) 120 include machine learning systems external to the computing system 110 and comprise and/or are configured as software programs or applications.

Process Flow Diagrams

Figure 2:
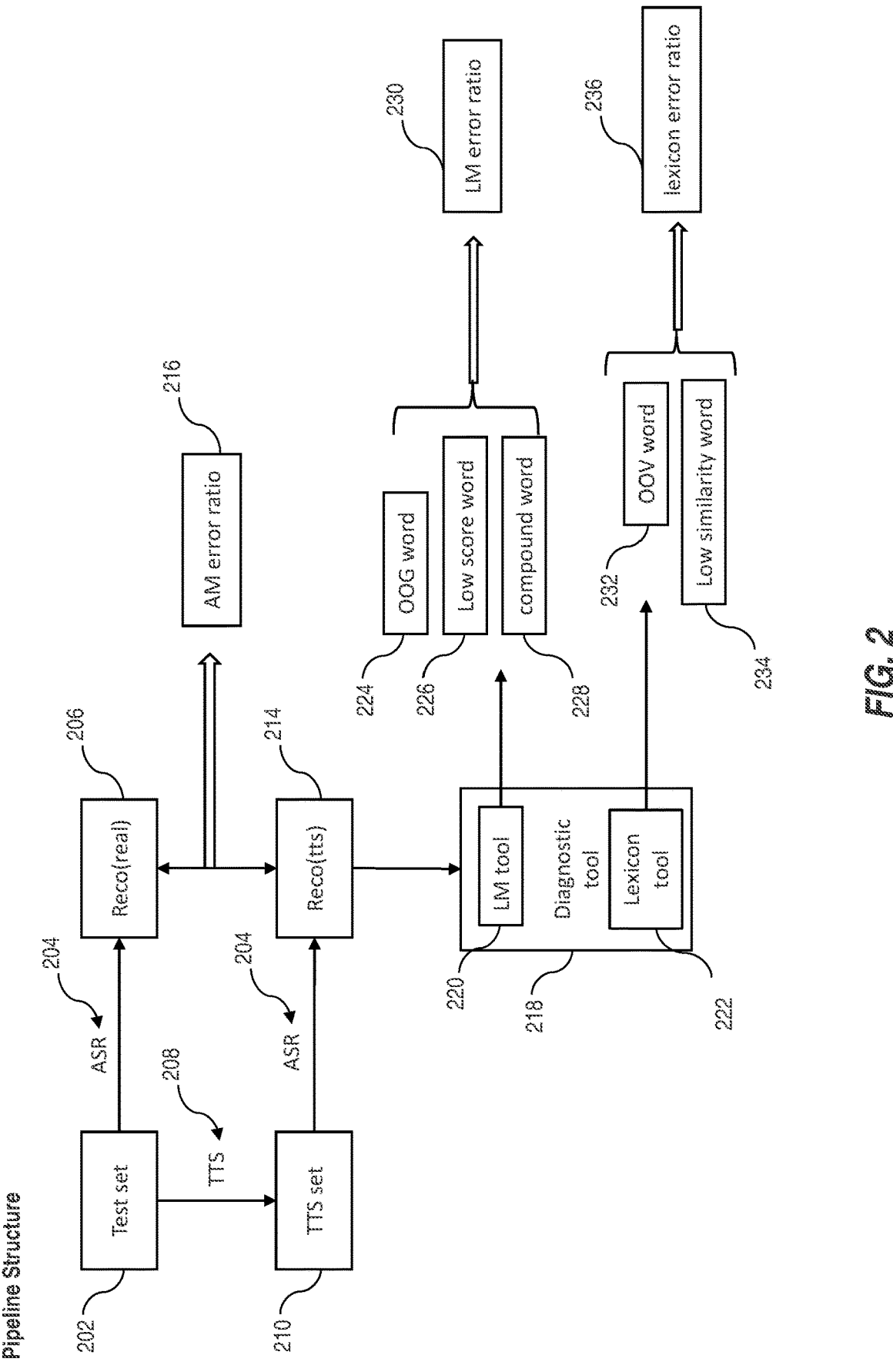
FIG. 2 illustrates an example embodiment of a process flow diagram for performing a comprehensive diagnostic test on an automatic speech recognition system to determine error ratios associated with automatic speech recognition system.

Attention will now be directed to FIG. 2, which illustrates an example embodiment of a process flow diagram for performing a comprehensive diagnostic test on an automatic speech recognition system to determine error ratios associated with automatic speech recognition system. FIG. 2 illustrates that the system obtains a test set 202 (e.g., test dataset 141) and a TTS set 210 (e.g., TTS datasets 142) which are each applied to the ASR system 204 (e.g., ASR system 143). The TTS set 210 is obtained by applying ground truth transcription labels included in the test set 202 to a TTS system 208. A test set recognition output 206 is obtained from applying the test set 202 to the ASR system, and a TTS set recognition output 214 is obtained from applying the TTS set 210 to the ASR system. Errors are identified in each output. The outputs comprise transcribed speech utterances recognized from the audio included in the input datasets (e.g., test set 202, TTS set 210). The errors are recognized, in part, by comparing the output against the ground truth labels included in the input datasets. The system compares the different errors from one output against the errors identified in the other output in order to determine the acoustic model error ratio 216.

The TTS set recognition output 214 is then applied to the diagnostic tool 218 comprises a language model tool 220 which analyzes the output for errors that are attributable to the language model and a lexicon tool 222 which analyzes the output for errors that are attributable to the lexicon. The TTS audio is used because the audio synthesized from the ground truth transcription labels included in the test set 202 is a cleaner reference signal than the original audio included in the test set 202. For example, a word that can be correctly recognized in the TTS audio is more likely to gauge the accuracy of the language model and lexicon. Any discrepancies caused between the different acoustic model's outputs may be associated with different background noise levels, accents of the speakers, or modeling error of the original audio.

The language model tool 220 of the diagnostic tool 218 (e.g., diagnostic engine 152) is able to categorize errors associated with the language model as out-of-grammar words (OOG word 224), low score words 226, and/or compound words 228. Each of the different errors is analyzed, and a language model error ratio 230 is generated. The lexicon tool 222 of the diagnostic tool 218 is able to categorize errors associated with the lexicon as out-of-vocabulary words 232 and low similarity words 234. These errors are analyzed, and the lexicon error ratio 236 is generated.

Acoustic Model Error

Figure 3:
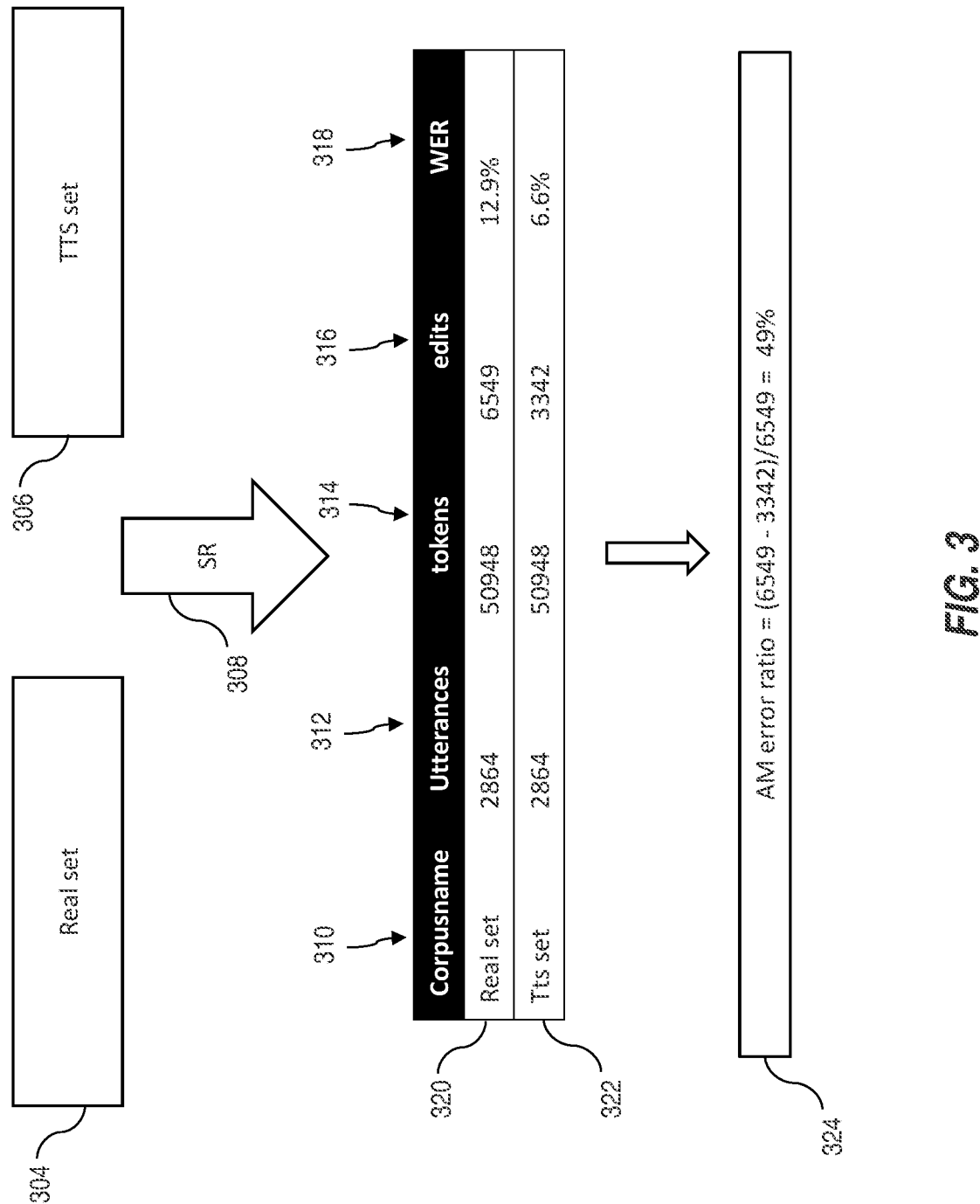
FIG. 3 illustrates an example embodiment of a process flow diagram for determining the error ratio of an acoustic model of an automatic speech recognition system.

Attention will now be directed to FIG. 3, which illustrates an example embodiment of a process flow diagram for determining the error ratio of an acoustic model of an automatic speech recognition system. First, the system obtains a test set (e.g., Librispeech real set 304) and a TTS set (e.g., Librispeech TTS set 306). Each of these input datasets are associated with a particular domain to which the user has previously customized the ASR system. The TTS set is obtained by running the script of the TTS set through a TTS system (e.g., TTS system 208), wherein the real set and the TTS set are both passed through a speech recognition system (e.g., SR 308), particularly, the acoustic model of a speech recognition system. The system then obtains outputs for each of the different datasets and analyzes each dataset. For example, as illustrated in table 310, the ASR output from the real set 320 is associated with 2864 utterances 312, 50948 token 314, 6549 edits, and a WER 318 of 12.9%. The ASR output from the TTS set 322 is associated with 2864 utterances 312, 50948 tokens 314, 3342 edits 316, and a WER 318 of 6.6%.

Beneficially, the number of utterances and tokens recognized is equal, meaning that the acoustic model recognized the same number of utterances and tokens in both sets (which presumably should have the same number of spoken language utterances). Also, because the TTS set 322 includes a cleaner reference audio signal, the system (or a human labeler) made less edits (i.e., error corrections) in the TTS set 322 than the real set 320. The lower number of edits contributed to the lower WER for the TTS set 322. The system assumes that the TTS set is more accurate as a baseline, and compares the TTS set results against the real set results to obtain the acoustic model error ratio 324. In some instances, the acoustic model error ratio is calculated by subtracting the number of TTS set edits (3342) from the number of real set edits (6549), and then dividing that results by the real set edits (6549). As illustrated, the customized acoustic model (e.g., as part of SR 308) is associated with an acoustic model error ratio of 49%.

Lexicon/Language Model Error

Figure 4:
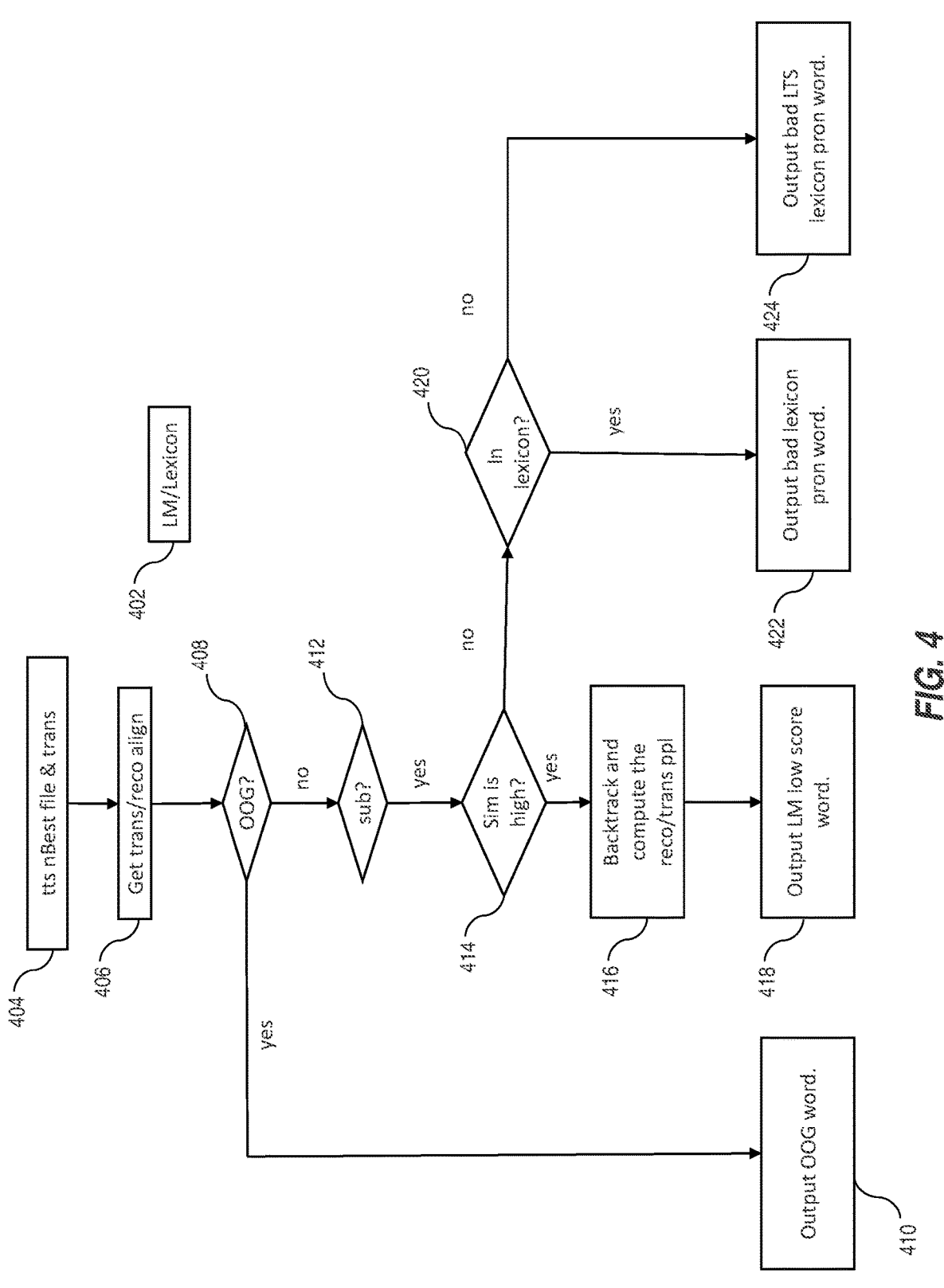
FIG. 4 illustrates an example embodiment of a process flow diagram for performing a diagnostic test on the language model and lexicon of an automatic speech recognition system to determine error ratios associated with the language model and the lexicon.

Attention will now be directed to FIG. 4, which illustrates an example embodiment of a process flow diagram for performing a diagnostic test on the language model and lexicon (e.g., LM/Lexicon 402) of an automatic speech recognition system to determine error ratios associated with the language model and the lexicon. The diagnostic tool obtains the nBest TTS files, including the corresponding ground truth labels (e.g., TTS set acoustic model output 404). The TTS transcription and ground truth label transcription are aligned (e.g., get trans/reco align 406) and processed to recognize and understand utterances included in the TTS/acoustic model output 404. One or more low recall words is identified. First, a particular low recall word is analyzed. For example, if the low recall word is determined to be out-of-grammar (e.g., OOG 408), the system outputs the OOG word and presents it to the user. If the low recall word is not OOG 408, the system determines whether the low recall word is substitution error (e.g., sub 412).

If the low recall word is associated with a substitution error, then the system determines whether the pronunciation similarity between the recognition output and the original transcription is high or low (e.g., "sim is high?" 414). If the similarity is high, then the system backtracks (e.g., around 5 grams) and computes the recognition and transcription scores (e.g., backtrack and compute the reco/trans ppl 416). If the recognition perplexity score is lower than that of the transcription perplexity score, then the system outputs the low recall word as a language model low score word (e.g., output LM low score word 418).

If the similarity is not high, then the system determines whether the low recall word is found in the lexicon (e.g., in lexicon 420). If the word is found in the lexicon, but the pronunciation has a low similarity score, then the system outputs the low recall word as a low similarity word (e.g., output bad lexicon pronunciation word 422). If the low recall word is not found in the lexicon, then the system outputs the low recall world as an out-of-vocabulary word (e.g., output bad LTS lexicon pronunciation word 424).

Diagnostic Advice

Figure 5:
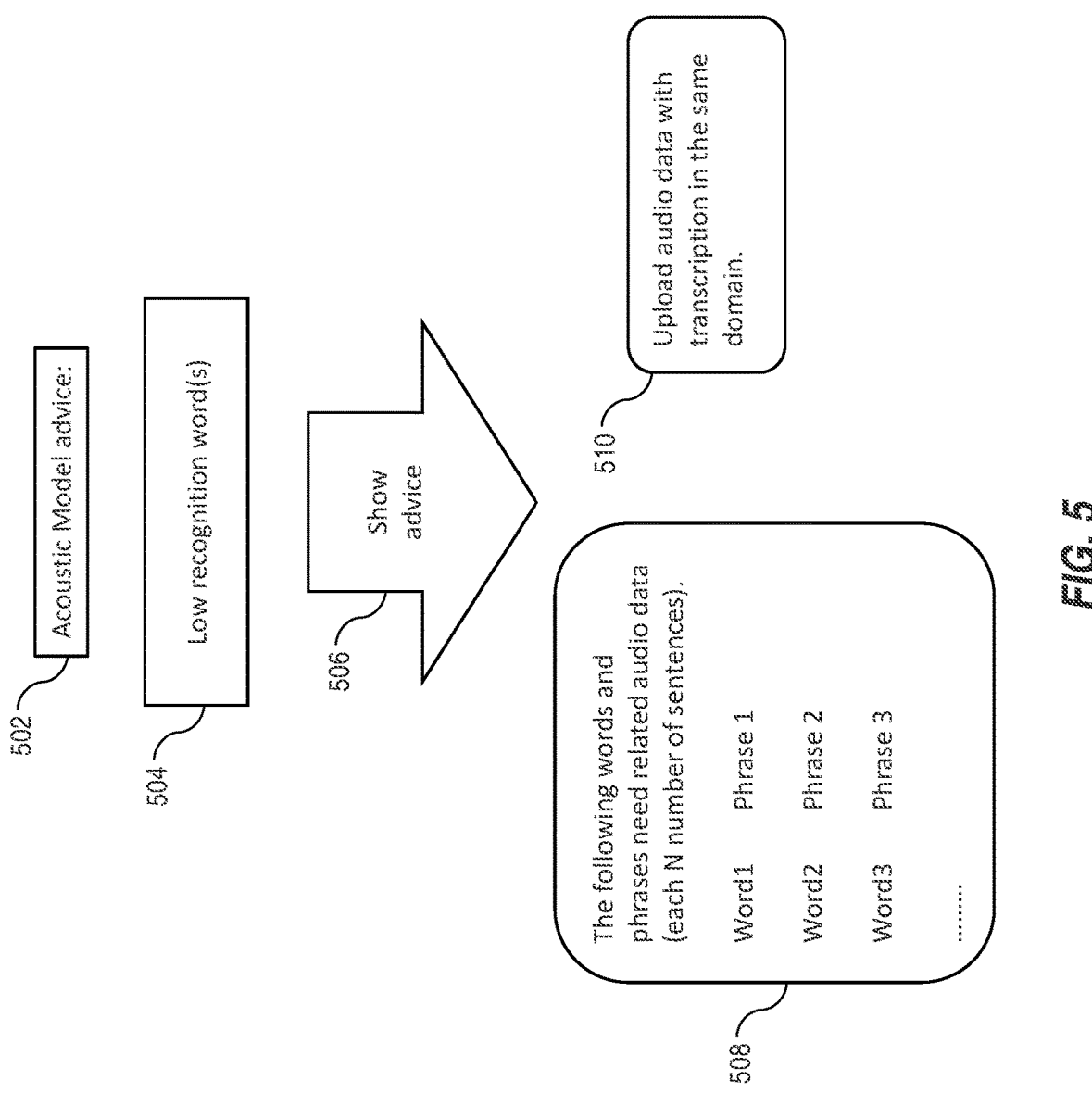
FIG. 5 illustrates an example embodiment of a process flow diagram for generating advice for improving an acoustic model.

Attention will now be directed to FIG. 5, which illustrates an example embodiment of a process flow diagram for generating advice for improving an acoustic model.

After the diagnostic system determines an acoustic model error ratio, the system generates acoustic model advice 502. First, low recognition word(s) 504 are identified, wherein advice is presented to the user (e.g., show advice 506) within a user interface 508 according to the different low recognition words. As illustrated, a plurality of utterances (e.g., word 1, word 2, word 3, found in phrase 1, phrase 2, and phrase 3 respectively) were identified as low recognition words. The advice then suggests that each of those words and phrases need related audio data (e.g., N number of sentences each) to be included in a target dataset that will be applied to further refine the acoustic model and improve the error ratio.

In a preferred embodiment, advice is presented to the user (e.g., show advice 506) which comprises advice to upload audio data in the same domain as the original test dataset, along with the transcription for the audio data (see, user interface 510).

Figure 6:
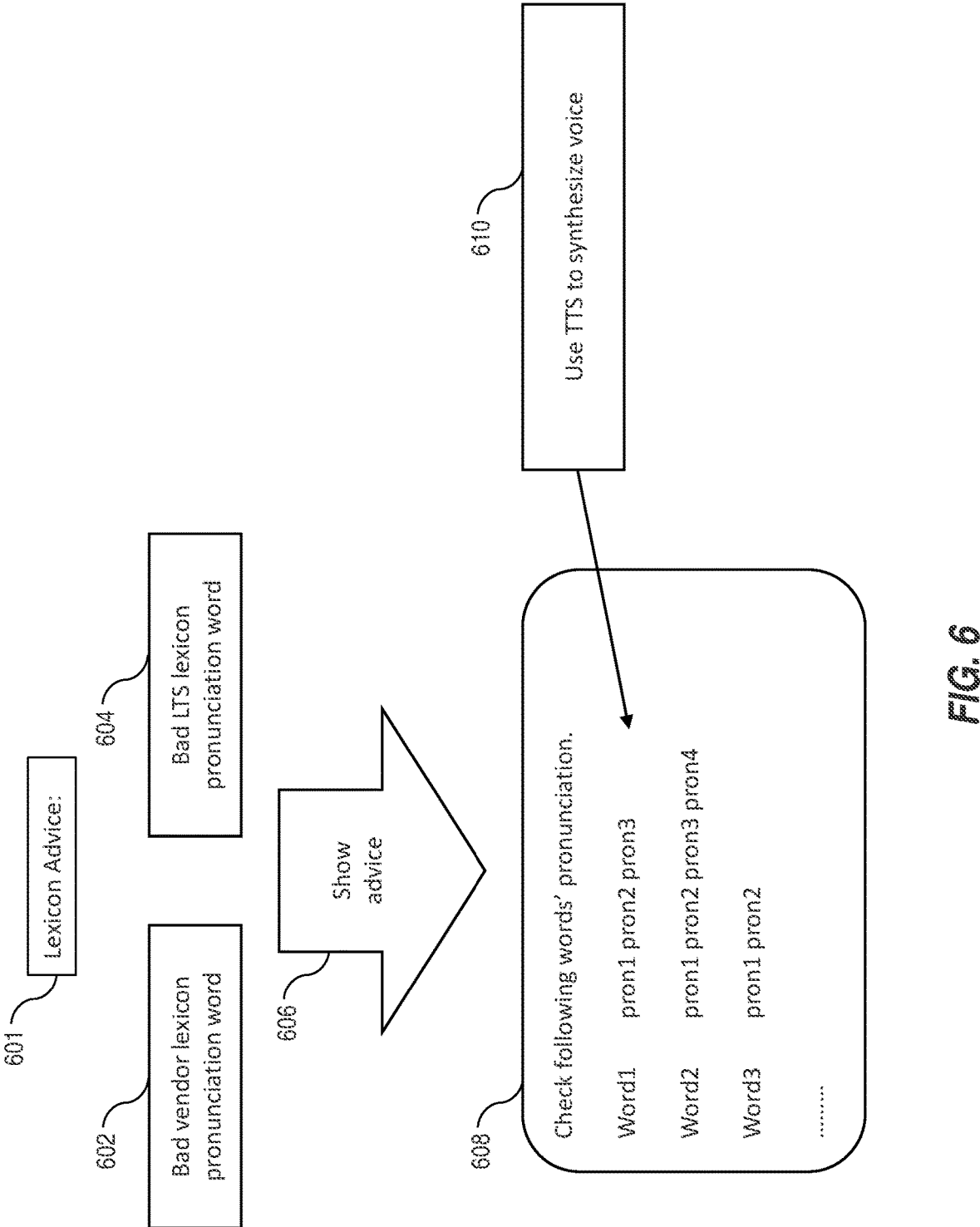
FIG. 6 illustrates an example embodiment of a process flow diagram for generating advice for improving a lexicon of an automatic speech recognition system.

Attention will now be directed to FIG. 6, which illustrates an example embodiment of a process flow diagram for generating advice for improving a lexicon of an automatic speech recognition system.

After the diagnostic system determines a lexicon error ratio, the system generates lexicon advice 601. First, bad vendor lexicon pronunciation words 602 (e.g., output bad lexicon pronunciation words 422) and bad LTS lexicon pronunciation words 604 (e.g., output bad LTS lexicon pronunciation words 424) are identified. Advice associated with those identified words is presented to the user (e.g., show advice 606) within an advice user interface 608 according to the identified words and their corresponding pronunciations.

As illustrated, word 1 is shown corresponding to pronunciation 1, pronunciation 2, and pronunciation 3. Word 2 is shown corresponding to pronunciation 1, pronunciation 2, pronunciation 3, and pronunciation 4. Word 3 is shown corresponding to pronunciation 1 and pronunciation 2. The advice then suggests to a user to "Check the following words' pronunciations". In some instances, a TTS system (e.g., TTS system 208) is used to synthesize the voice (e.g., use TTS to synthesize voice 610) for each of the different words/corresponding pronunciations. The user is then able to verify which pronunciation is correct, or whether multiple pronunciations are correct, or whether none of the pronunciations are correct.

If no pronunciation is correct, the advice user interface 608 also shows a suggestion to collect more data to provide the lexicon with the correct pronunciation for each word that does not have a good pronunciation. Users are able to upload their own recordings of the correct pronunciation or retrieve an audio file from a third-party source to obtain the correct pronunciation.

Figure 7:
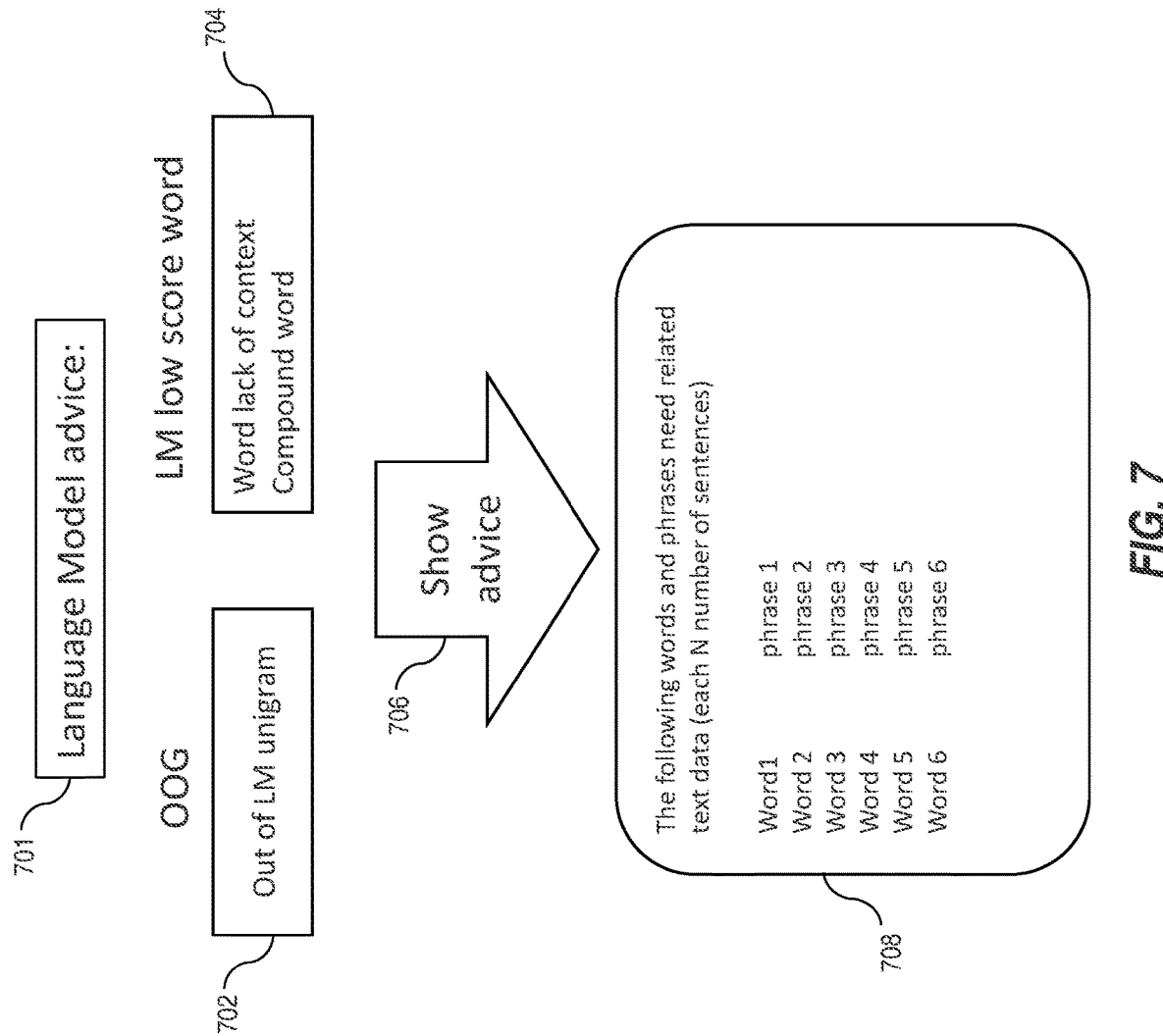
FIG. 7 illustrates an example embodiment of a process flow diagram for generating advice for improving a language model of an automatic speech recognition system.

Attention will now be directed to FIG. 7, which illustrates an example embodiment of a process flow diagram for generating advice for improving a language model (LM) of an automatic speech recognition system.

After the diagnostic system determines a language model error ratio, the system generates language model advice 701. First, low recall words are identified and then categorized as out-of-grammar (OOG) words (e.g., out of LM unigram 702, output OOG word 410) and/or LM low score words 704 including lack of context word or compound word (e.g., output LM low score word 418, see also: OOG word 224, low score word 226, compound words 228), wherein advice is presented to the user (e.g., show advice 706) within a user interface 708 according to the different low recognition words. As illustrated, a plurality of utterances (e.g., word 1, word 2, word 3, word 4, word 5, and word 6 found in phrase 1, phrase 2, phrase 3, phrase 4, phrase 5, and phrase 6, respectively) were identified as low recall words. The advice then suggests that each of those words and phrases need related text data (e.g., N number of sentences each) to be included in a target dataset that will be applied to further refine the language model and improve the error ratio.

Figure 8:
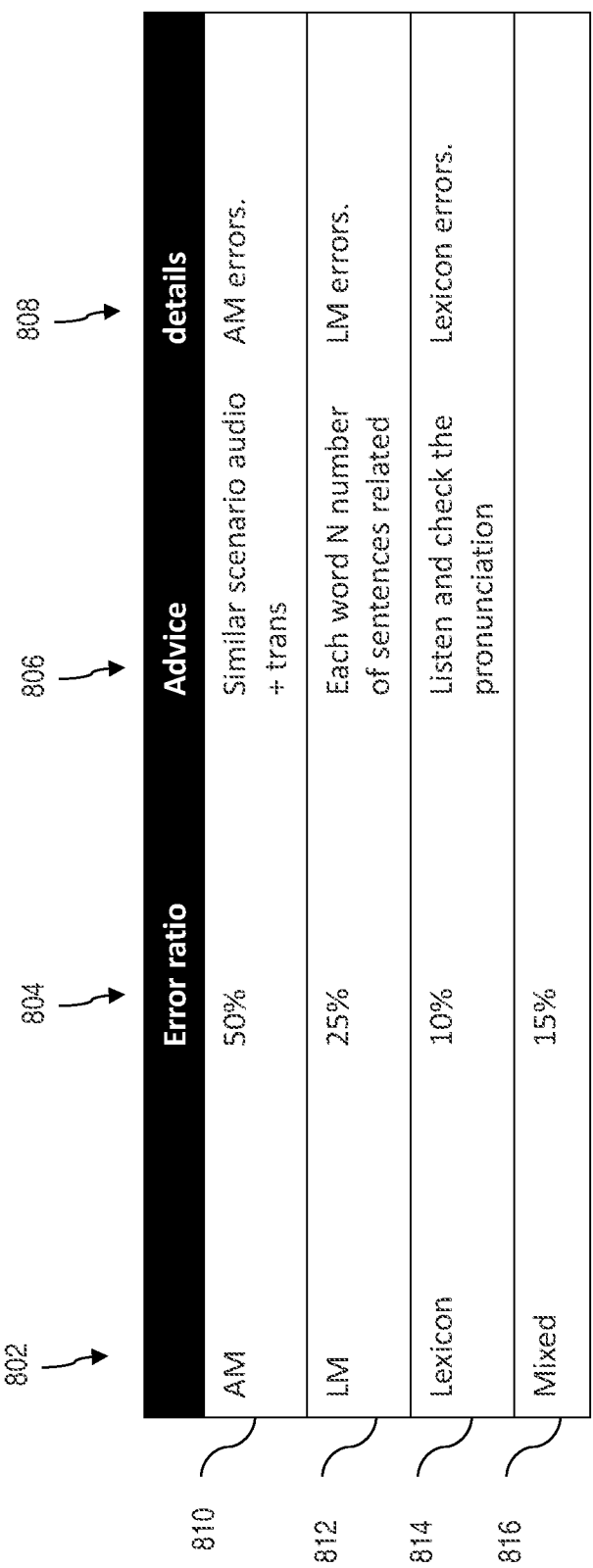
FIG. 8 illustrates an example embodiment of a table configured to display different error ratios to a user.

Attention will now be directed to FIG. 8, which illustrates an example embodiment of a table configured to display different error ratios to a user. As illustrated, the system displays different information regarding about the diagnostic results of the ASR system (e.g., ASR system 143) according to the different models (e.g., acoustic model 810, language model 812, lexicon 814, or a mix 816 of the different model). As illustrated in table 802, an error ratio 804 is displayed for each of the models (e.g., 50% acoustic model error ratio, 25% error ratio language model ratio, 10% lexicon error ratio, and 15% error ratio for mixed sources of errors).

The system also displays advice 806 to improve each of the error ratios. As illustrated, based on the diagnostics results for the acoustic model, the system prompts the user to obtain "similar scenario audio and transcription." Based on the diagnostic results of the language model, the system prompts the user to obtain for "each word (e.g., low recall word) one or more sentences related to each word." Based on the diagnostic results of the lexicon, the system prompts the user to "listen and check the pronunciation" for OOV (out-of-vocabulary) or low similarity words. The system also displays details 808 about each of the error ratios and the corresponding advice explaining the different AM errors, LM errors, and Lexicon errors.

Using the information displayed in FIG. 8, a user is able to determine how to augment the training and further refinement of a previously customized ASR system. The user knows which model of the ASR system is contributing to the overall accuracy score of the ASR system. Additionally, users are able to know which kinds of data they should collect to improve each of the models. It should be appreciated that the information generated by the diagnostic tool (e.g., diagnostic engine 152 and advice engine 153) can be displayed in a variety of configurations and layouts. In this manner, the user is able to determine the best course of action to improve the ASR system. For example, because the user sees that the acoustic model 810 has the highest error ratio (50%) as compared to the other error ratios, the user may choose to follow the advice 806 to obtain "similar scenario audio and transcription" and refine the ASR system on those targeted datasets first.

Additionally, or alternatively, the user may assess each of the advice prompts and determine that the advice to "listen and check the pronunciation" is the most accessible task given other restraints. In such instances, the user is able to choose which advice prompt to follow. No matter which advice prompt the user follows, at least one of the error ratios will improve with the additional training provided by the targeted datasets obtained by the user to refine the ASR system.

Post-Refinement Diagnostic Results

Figure 9:
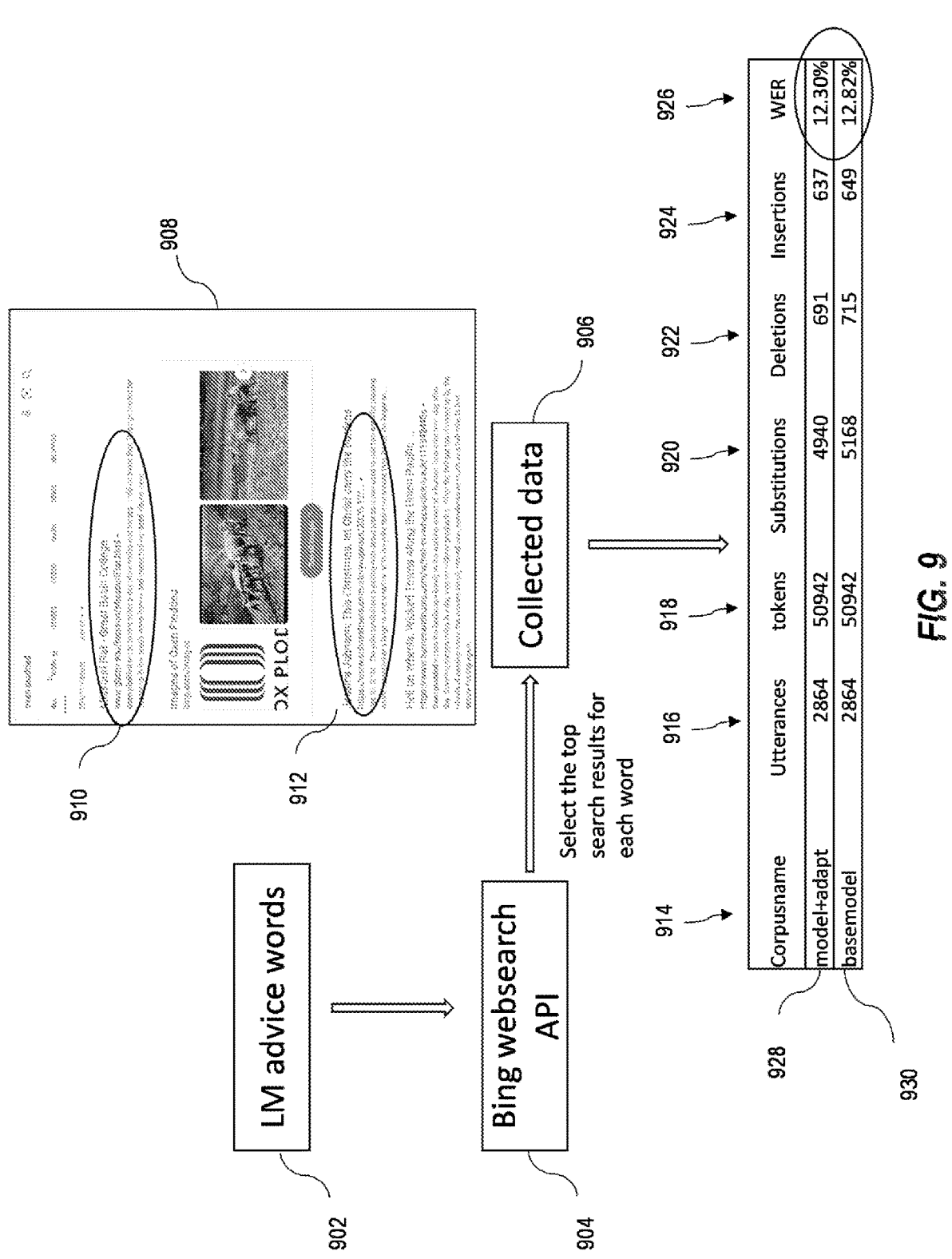
FIG. 9 illustrates an example embodiment of a process flow diagram for refining a previously customized automatic speech recognition model based on advice generated from performing a diagnostic test on the previously customized automatic speech recognition model.

Attention will now be directed to FIG. 9, which illustrates an example embodiment of a process flow diagram for refining a previously customized automatic speech recognition model based on advice generated from performing a diagnostic test on the previously customized automatic speech recognition model.

As illustrated, a language model advice prompt has identified a set of low recall words (e.g., LM advice words 902). In response, the user is prompted to collect additional data to augment the original customization training data that was used to previously customize the ASR system. FIG. 9 shows that the user used an internet search tool (e.g., Bing web search API 904) to search for and select a top number (e.g., 50) search results for each word identified in the LM advice words 902. For example, the collected data 906 is pulled from search results 908 including text portion 910 and text portion 912 which includes textual data associated with the low recall phrase "oxen plodded".

The collected data 906 is then applied to the language model of the ASR system (or the ASR system as a whole) to further refine the customization of the ASR system. Diagnostics are run on the language model (or entire ASR system) before and after the additional refinement/adaptation. FIG. 9 depicts a table 914 summarizing the results for the model before refinement (e.g., base model 930) and the model after refinement (e.g., model+adapt 928). The table 914 shows the utterance count 916, the token count 918, the substitution error count 920, the deletion error count 922, insertion error count 924, and the overall word error rate (WER 926) corresponding to each version of the model.

As illustrated, the base model 930 diagnostic results included 2864 utterances, 50942 tokens, 5168 substitutions, 715 deletions, 649 insertions, and a WER of 12.82%. The model+adapt 928 diagnostic results included 2864 utterances, 50942 tokens, 4940 substitutions, 691 deletions, 637 insertions, and a WER of 12.30%. The WER rate is decreased after adaption, showing an improvement in the accuracy of the language model. It should be appreciated that while FIG. 9 illustrates a process flow diagram for improving the language model, similar processes are applicable to the other models (e.g., Lexicon and/or Acoustic model) to improve the respective error ratios.

In view of the foregoing, it will be appreciated that the methods referenced in regard to FIG. 9 beneficially facilitate the improvement of an ASR system by identifying errors according to the different models of the ASR system and prompting a user to obtain additional datasets that are datasets targeted to a particular domain to which the user wishes to adapt/customize the ASR system.

Example Methods

Attention will now be directed to FIGS. 10-12, which illustrate various flow diagrams that include acts associated with exemplary methods that are configured to be implement by a computing system (e.g., computing system 110) to perform one or more of the disclosed embodiments. Although the method acts may be discussed in a certain order or illustrated in a flow chart as occurring in a particular order, no ordering is required unless specifically stated, or required because an act is dependent on another act being completed prior to the act being performed.

Attention will now be directed to FIG. 10, which illustrates a process flow diagram comprising a plurality of acts associated with identify targeted datasets configured to facilitate an improvement in an accuracy of an acoustic model included in an automatic speech recognition system, whereby an overall accuracy of the automatic speech recognition system is improved, FIG. 10, in some reference to FIG. 1, illustrates a flow diagram 1000 that includes various acts (act 1010, act 1020, act 1030, act 1040, and act 1050) associated with exemplary methods that can be implemented by computing system 110 (see FIG. 1) for generating an acoustic model error ratio. For example, disclosed systems are configured to obtain a test dataset comprising (i) audio data having a plurality of natural speech utterances and (ii) a transcription of the plurality of natural speech utterances (act 1010). Systems generate a text-to-speech dataset comprising audio data having a plurality of synthesized speech utterances based on the transcription of the plurality of natural speech utterances (act 1020).

Systems then apply the test dataset and the text-to-speech dataset to the automatic speech recognition system to obtain a first model output corresponding to the test dataset and a second model output corresponding to the text-to-speech dataset (act 1030). Subsequently, systems identify a first set of errors in the first model output and a second set of errors in the second model output (act 1040). Based on comparing the first set of errors and the second set of errors, systems generate an acoustic model error ratio (act 1050).

Finally, systems use the acoustic model error ratio to identify a set of characteristics for one or more additional datasets to be applied to the automatic speech recognition system to facilitate an improvement in the acoustic model error ratio when applying at least one of the one or more identified additional datasets to the automatic speech recognition system (act 1060). In some instances, the set of characteristics includes advice configured to be presented to a user on how to improve the acoustic model error ratio. For example, the advice presented to the user may include one or more additional datasets that are applicable to the automatic speech recognition system to further train and customize the automatic speech recognition system so that the acoustic model error ratio is improved.

Additionally, or alternatively, the system can automatically identify the additional datasets and/or select a preferred or target dataset to use for training the model based on the error ratio(s) and/or set of characteristics.

In some instances, the system also distinguishes between a plurality of identified additional datasets that are each configured to be applied to the automatic speech recognition system, based on the set of attributes and corresponding acoustic model error ratio, to identify and select the preferred or targeted dataset from the one or more identified additional datasets to apply as training data to the automatic speech recognition system to facilitate an improvement in the acoustic model error ratio of the automatic speech recognition system. Again, this can be done automatically. If a user chooses to follow the prompt to obtain one or more additional datasets, the system is configured to receive the targeted dataset(s) and train the automatic speech recognition system with the targeted dataset to modify the automatic speech recognition system to generate refined output that is associated with fewer errors than first model output. After refining the ASR system on the new datasets, the computing system can determine that the acoustic model has an improved acoustic model error ratio based on analyzing the refined output.

The system employs different methods to identify different target datasets for the user to obtain. For example, in some instances, the system identifies one or more characteristics associated with the test dataset, wherein the targeted dataset is selected from the one or more additional datasets based on the targeted dataset corresponding to the one or more characteristics. The one or more characteristics are identified based on a particular speaking scenario, a particular set of background noises, a particular enterprise domain, or other customized domain associated with the test dataset.

Attention will now be directed to FIG. 11, which illustrates a process flow diagram comprising a plurality of acts associated with identify targeted datasets configured to facilitate an improvement in an accuracy of a language model and lexicon included in an automatic speech recognition system, whereby an overall accuracy of the automatic speech recognition system is improved.

FIG. 11, in some reference to FIG. 1, illustrates a flow diagram 1100 that includes various acts (act 1110, act 1120, act 1130, act 1140, act 1150, and act 1160) associated with exemplary methods that can be implemented by computing system 110 (see FIG. 1) for suggesting to a user one or more additional datasets configured to refine an automatic speech recognition model. For example, disclosed systems are configured to apply as input a test dataset comprising (i) a text transcription and (ii) audio data having a plurality of synthesized speech utterances generated using a text-to-speech system based on the text transcription (act 1110). Additionally, systems are configured to obtain a first output corresponding to the lexicon based on the test dataset (act 1120) and identify a first set of errors in the first output and distinguish between one or more errors included in the first set of errors according to different types of errors associated with the lexicon (act 1130).

Systems are also configured to obtain a second output corresponding to the language model based on the test dataset (and results from a lexicon tool) (act 1140) and identify a second set of errors in the second output and distinguish between one or more errors in the second set of errors according to different types of errors associated with the language model (act 1150). Systems are configured to subsequently generate a language model error ratio for the language model and a lexicon error ratio for the lexicon (act 1160). Based on the first set of errors and second set of errors, systems are configured to identify and distinguish between one or more additional datasets configured to be applied to the language model and the lexicon to facilitate an improvement in the automatic speech recognition system (act 1170). This process can be performed automatically, as can any of the other processes described herein.

In some instances, systems are also configured to distinguish between the one or more errors at least based on at least on the generated text-to-speech dataset.

After determining different error ratios associated with the ASR system, the computing system is configured to prompt a user to obtain the one or more additional datasets, receive the one or more additional datasets obtained by the user, and apply the one or more additional datasets to the automatic speech recognition system. This process facilitates an improvement in the lexicon error ratio and/or the language model error ratio.

As described, the system is able to identity and distinguish between different datasets which can be applied to the ASR system to further refine and adapt the ASR system to the user's customized domain. For example, the system can be configured to identify one or more words or phrases that correspond to the second set of errors. One or more additional datasets that a user is prompted to obtain comprises a plurality of sentences including a particular word or phrase for each of the one or more words or phrases.

Additionally, or alternatively, the system is configured to identify one or more words that correspond to the first set of errors and then prompt a user to verify a pronunciation of each of the one or more words. In such configurations, one or more additional datasets comprises a new pronunciation for each of the one or more words that the user has determined does not have a correct pronunciation included within the lexicon.

The computing system is able to categorize the identified errors according to the different models. For example, some errors are attributable to the language model. Different types of errors that are attributable to the language model include out-of-grammar words, low score words, and/or compound words.

The computing system is also able to attribute some errors to the lexicon. Different types of errors that are attributable to the lexicon model include out-of-vocabulary words and low similarity words.

Attention will now be directed to FIG. 12, which illustrates a process flow diagram comprising a plurality of acts associated with identify targeted datasets configured to facilitate an improvement in an overall accuracy of the automatic speech recognition system.

FIG. 12, in some reference to FIG. 1, illustrates a flow diagram 1200 that includes various acts (act 1210, act 1220, act 1230, act 1240, act 1250, and act 1260) associated with exemplary methods that can be implemented by computing system 110 (see FIG. 1) for refining a previously customized automatic speech recognition system.

For example, disclosed systems are configured to apply as input a test dataset to the automatic speech recognition system to obtain an initial output (act 1210). The automatic speech recognition system includes an acoustic model, a language model, and a lexicon, and the test dataset includes (i) a text transcription and (ii) audio data having a plurality of natural speech utterances and a plurality of synthesized natural speech utterances.

Systems are configured identify one or more types of errors included in the initial output (act 1220). Based on the one or more types of errors included in the initial output, systems generate an error score for each of the acoustic model, the language model, and the lexicon (act 1230).

Systems are also configured to identify and distinguish between one or more additional datasets based on the generated error scores for the acoustic model, the language model, and the lexicon (act 1240). The one or more additional datasets are configured to be applied to the automatic speech recognition system to facilitate an improvement in the accuracy of the automatic speech recognition system by correcting the one or more types of errors identified in the initial output.

Subsequently, systems prompt a user to obtain the one or more additional datasets (act 1250), wherein systems then apply the one or more additional datasets to the automatic speech recognition system to generate a refined output having an improved error score corresponding to at least one of: the acoustic model, the language model, or the lexicon (act 1260)

In some instances, the initial output comprises a first output from the acoustic model. In such instances, the first output comprises a plurality of speech utterances recognized from the audio data, a second output from the language model, and a third output from the lexicon. Furthermore, the first output is applied as input to the language model and the lexicon to obtain the second output and the third output.

When a second output is obtained, the system is configured to identify a set of low recall words included in the second output, determine that one or more low recall words of the set of low recall words included in the second output are out-of-grammar with respect to the language model, and present the one or more low recall words to the user, such that the one or more additional datasets correspond to the one or more low recall words that are determined to be out-of-grammar.

In some instances, low recall words are categorized by analyzing the errors sequentially. For example, the system is configured to identify a low recall word included in the second output. The system then determines that the low recall word included in the second output is not out-of-grammar with respect to the language model. Subsequently, the system is configured to determine whether the low recall word is associated with a substitution error, a deletion error, or an insertion error.

Upon determining that the low recall word is associated with a substitution error, the system is able to determine that whether there exists a pronunciation similarity between the low recall word included in the plurality of speech utterances recognized by the acoustic model and the low recall word included in a transcription of the plurality of speech utterances.

In view of the foregoing, it will be appreciated that the disclosed systems and methods provide many improvements and techniques over existing speech recognition systems and particularly for customizing and improving the accuracy of the speech recognition systems when they are applied to customized environments and circumstances.

Example Computing Systems

Embodiments of the present invention may comprise or utilize a special purpose or general-purpose computer (e.g., computing system 110) including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media (e.g., hardware storage device(s) 140 of FIG. 1) that store computer-executable instructions (e.g., computer-readable instructions 118 of FIG. 1) are physical hardware storage media/devices that exclude transmission media. Computer-readable media that carry computer-executable instructions or computer-readable instructions (e.g., computer-readable instructions 118) in one or more carrier waves or signals are transmission media. Thus, by way of example, and not limitation, embodiments of the invention can comprise at least two distinctly different kinds of computer-readable media: physical computer-readable storage media/devices and transmission computer-readable media.

Physical computer-readable storage media/devices are hardware and include RAM, ROM, EEPROM, CD-ROM or other optical disk storage (such as CDs, DVDs, etc.), magnetic disk storage or other magnetic storage devices, or any other hardware which can be used to store desired program code means in the form of computer-executable instructions or data structures and which can be accessed by a general purpose or special purpose computer.

A "network" (e.g., network 130 of FIG. 1) is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry, or desired program code means in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

In view of the foregoing, it will be appreciated that the disclosed embodiments include and/or can be implemented to provide many technical benefits over conventional systems and methods for performing diagnostics on an automatic speech recognition model to identify errors in the speech recognition output, attributing the errors to a particular source associated with the automatic speech recognition system, providing feedback to a user, and suggesting solutions to improve the accuracy of the automatic speech recognition system.

What is claimed is:

1. A computing system configured to identify targeted datasets configured to facilitate an improvement in an accuracy of an acoustic model included in an automatic speech recognition system, whereby an overall accuracy of the automatic speech recognition system is improved, the computing system comprising:

one or more processors; and one or more hardware storage devices storing one or more computer-executable instructions that are executable by the one or more processors to configure the computing system to:

obtain a test dataset comprising (i) audio data having a plurality of natural speech utterances and (ii) a transcription of the plurality of natural speech utterances;

generate a text-to-speech dataset comprising audio data having a plurality of synthesized speech utterances based on the transcription of the plurality of natural speech utterances;

apply the test dataset and the text-to-speech dataset to the automatic speech recognition system to obtain a first model output corresponding to the test dataset and a second model output corresponding to the text-to-speech dataset;

identify a first set of errors in the first model output and a second set of errors in the second model output; and based on comparing the first set of errors and the second set of errors, generate an acoustic model error ratio; and use the acoustic model error ratio to identify a set of characteristics for one or more additional datasets to be applied to the automatic speech recognition system to facilitate an improvement in the acoustic model error ratio when applying at least one of the one or more identified additional datasets to the automatic speech recognition system.

2. The computing system of claim 1, the one or more computer-executable instructions being further executable by the one or more processors to further configure the computing system to:

distinguish between the one or more identified additional datasets configured to be applied to the automatic speech recognition system, based on the set of attributes and corresponding acoustic model error ratio, to identify and select a targeted dataset from the one or more identified additional datasets to apply as training data to the automatic speech recognition system to facilitate an improvement in the acoustic model error ratio of the automatic speech recognition system.

3. The computing system of claim 2, the one or more computer-executable instructions being further executable by the one or more processors to further configure the computing system to:

train the automatic speech recognition system with the targeted dataset to modify the automatic speech recognition system to generate refined output that is associated with fewer errors than first model output; and determine that the acoustic model has an improved acoustic model error ratio based on analyzing the refined output.

4. The computing system of claim 2, the one or more computer-executable instructions being further executable by the one or more processors to further configure the computing system to:

identify one or more characteristics associated with the test dataset, wherein the targeted dataset is selected from the one or more additional datasets based on the targeted dataset corresponding to the one or more characteristics.

5. The computing system of claim 4, wherein the one or more characteristics are identified from: a particular speaking scenario or a particular set of background noises.

6. The computing system of claim 4, wherein the one or more characteristics are associated with a particular enterprise domain.

7. A computing system configured to identify targeted datasets to be used to facilitate an improvement in an accuracy of a language model and a lexicon included in an automatic speech recognition system, the computing system comprising:

one or more processors; and one or more hardware storage devices storing one or more computer-executable instructions that are executable by the one or more processors to configure the computing system to:

apply as input a test dataset comprising (i) a text transcription and (ii) audio data having a plurality of synthesized speech utterances generated using a text-to-speech system based on the text transcription;

obtain a first output corresponding to the lexicon based on the test dataset;

identify a first set of errors in the first output and distinguish between one or more errors included in the first set of errors according to different types of errors associated with the lexicon;

obtain a second output corresponding to the language model based on the test dataset;

identify a second set of errors in the second output and distinguish between one or more errors in the second set of errors according to different types of errors associated with the language model;

generate a language model error ratio for the language model and a lexicon error ratio for the lexicon; and based on the first set of errors and second set of errors, identify and distinguish between one or more additional datasets configured to be applied to the language model and the lexicon to facilitate an improvement in the automatic speech recognition system.

8. The computing system of claim 7, the one or more computer-executable instructions being further executable by the one or more processors to further configure the computing system to:

distinguish between the one or more errors at least based on at least on the generated text-to-speech dataset.

9. The computing system of claim 7, the one or more computer-executable instructions being further executable by the one or more processors to further configure the computing system to:

prompt a user to obtain the one or more additional datasets;

receive the one or more additional datasets obtained by the user; and apply the one or more additional datasets to the automatic speech recognition system in order to facilitate an improvement in the lexicon error ratio and/or the language model error ratio.

10. The computing system of claim 9, the one or more computer-executable instructions being further executable by the one or more processors to further configure the computing system to:

identify one or more words or phrases that correspond to the second set of errors, wherein at least one of the one or more additional datasets comprises a plurality of sentences including a particular word or phrase for each of the one or more words or phrases.

11. The computing system of claim 9, the one or more computer-executable instructions being further executable by the one or more processors to further configured the computing system to:

identify one or more words that correspond to the first set of errors; and prompt a user to verify a pronunciation of each of the one or more words, wherein at least one of the one or more additional datasets comprises a new pronunciation for each of the one or more words that the user has determined does not have a correct pronunciation included within the lexicon.

12. A computing system configured to identify targeted datasets to be used to facilitate an improvement in an accuracy of an automatic speech recognition system, the computing system comprising:

one or more processors; and one or more hardware storage devices storing one or more computer-executable instructions that are executable by the one or more processors to configure the computing system to:

apply as input a test dataset to the automatic speech recognition system to obtain an initial output, the automatic speech recognition system comprising an acoustic model, a language model, and a lexicon, the test dataset comprising (i) a text transcription, (ii) audio data having a plurality of natural speech utterances and a plurality of synthesized natural speech utterances;

identify one or more types of errors included in the initial output, the initial output;

based on the one or more types of errors included in the initial output, generate an error score for each of the acoustic model, the language model, and the lexicon;

identify and distinguish between one or more additional datasets based on the generated error scores for the acoustic model, the language model, and the lexicon, the one or more additional datasets configured to be applied to the automatic speech recognition system to facilitate an improvement in the accuracy of the automatic speech recognition system by correcting the one or more types of errors identified in the initial output;

prompt a user to obtain the one or more additional datasets; and apply the one or more additional datasets to the automatic speech recognition system to generate a refined output having an improved error score corresponding to at least one of: the acoustic model, the language model, or the lexicon.

13. The computing system of claim 12, wherein the initial output comprises a first output from the acoustic model, wherein the first output comprises a plurality of speech utterances recognized from the audio data, a second output from the language model, and a third output from the lexicon, wherein the first output is applied as input to the language model and the lexicon to obtain the second output and the third output.

14. The computing system of claim 13, the one or more computer-executable instructions being further executable by the one or more processors to further configure the computing system to:

identify a set of low recall words included in the second output;

determine that one or more low recall words of the set of low recall words included in the second output are out-of-grammar with respect to the language model; and present the one or more low recall words to the user, such that the one or more additional datasets correspond to the one or more low recall words that are determined to be out-of-grammar.

15. The computing system of claim 13, the one or more computer-executable instructions being further executable by the one or more processors to further configure the computing system to:

identify a low recall word included in the second output;

determine that the low recall word included in the second output is not out-of-grammar with respect to the language model;

determine whether the low recall word is associated with a substitution error; and upon determining that the low recall word is associated with a substitution error, determine that whether a pronunciation similarity exists between the low recall word included in the plurality of speech utterances recognized by the acoustic model and the low recall word included in a transcription of the plurality of speech utterances.

* * * * *